US012779457B2

(12) United States Patent
Nemiroski et al.

(10) Patent No.: US 12,779,457 B2
(45) Date of Patent: Nov. 3, 2026

(54) FLOW CELLS AND METHODS FOR THEIR MANUFACTURE AND USE

(71) Applicant: ILLUMINA CAMBRIDGE LIMITED, Cambridge (GB)

(72) Inventors: Alex Nemiroski, San Diego, CA (US); Drew Ival Frerichs, San Diego, CA (US); Julian Sean Alberni, San Diego, CA (US); Luke Daenitz, San Diego, CA (US); Edgar Gutierrez, San Diego, CA (US); Arnold Oliphant, San Diego, CA (US)

(73) Assignee: Illumina Cambridge Limited, Cambridge (GB)

( * ) Notice: Subject to any disclaimer, the term of this patent is extended or adjusted under 35 U.S.C. 154(b) by 937 days.

(21) Appl. No.: 17/796,853

(22) PCT Filed: Feb. 2, 2021

(86) PCT No.: PCT/US2021/016152
§ 371 (c)(1),
(2) Date: Aug. 1, 2022

(87) PCT Pub. No.: WO2021/158511
PCT Pub. Date: Aug. 12, 2021

(65) Prior Publication Data

US 2023/0054204 A1 Feb. 23, 2023

Related U.S. Application Data

(60) Provisional application No. 62/969,845, filed on Feb. 4, 2020.

(51) Int. Cl.
*B81C 3/00* (2006.01)
*B01L 3/00* (2006.01)
*B01L 3/02* (2006.01)

(52) U.S. Cl.
CPC ....... *B01L 3/502707* (2013.01); *B01L 3/0293* (2013.01); *B01L 2200/12* (2013.01);
(Continued)

(58) Field of Classification Search
None
See application file for complete search history.

(56) References Cited

U.S. PATENT DOCUMENTS 3,572,888 A 3/1971 Kawashima
3,765,745 A 10/1973 Burboeck
(Continued)

FOREIGN PATENT DOCUMENTS

EP 1 950 569 A1 7/2008
WO WO-91/06678 A1 5/1991
(Continued)

OTHER PUBLICATIONS

International Search Report and Written Opinion for International Application No. PCT/US2021/016152, 8 Pages, Jun. 16, 2021.
International Search Report and Written Opinion for International Application No. PCT/US2018/000164, 14 pages, Aug. 15, 2018.
(Continued)

*Primary Examiner* — Paul S Hyun
(74) *Attorney, Agent, or Firm* — Dierker & Kavanaugh, P.C.

(57) ABSTRACT

A flow cell that includes (a) a gasket interposed between a first substrate and a second substrate, wherein the gasket, the first substrate and the second substrate are impermeable to aqueous liquid and liquid adhesive, wherein the gasket has a footprint on the first substrate that delineates a channel for containing the aqueous liquid; (b) a via in the gasket, the via containing a solidified liquid adhesive that bonds the first substrate to the second substrate, wherein the solidified liquid adhesive in the via is separated from the channel by the gasket; and (c) a channel port connecting the channel to
(Continued)

the exterior of the flow cell, wherein the channel port is permeable to the aqueous liquid.

18 Claims, 20 Drawing Sheets

(52) U.S. Cl.
CPC .................. *B01L 2300/0816* (2013.01); *B01L 2300/0854* (2013.01); *B01L 2300/12* (2013.01)

(56) References Cited

U.S. PATENT DOCUMENTS 4,012,112 A 3/1977 Masterson
4,704,013 A 11/1987 Clark
4,865,716 A * 9/1989 Sibbald ................ G01N 27/283 156/305
4,902,132 A 2/1990 Murphy, Jr. et al.
5,130,238 A 7/1992 Malek et al.
5,455,166 A 10/1995 Walker
5,587,833 A 12/1996 Kamentsky
5,641,658 A 6/1997 Adams et al.
5,695,934 A 12/1997 Brenner
5,863,722 A 1/1999 Brenner
5,888,737 A 3/1999 DuBridge et al.
6,140,489 A 10/2000 Brenner
6,151,161 A 11/2000 Mayer et al.
6,175,002 B1 1/2001 DuBridge et al.
6,214,587 B1 4/2001 Dattagupta et al.
6,266,459 B1 7/2001 Walt et al.
6,272,939 B1 * 8/2001 Frye .................... B01L 3/50853 73/864.81
6,355,431 B1 3/2002 Chee et al.
6,770,441 B2 8/2004 Dickinson et al.
6,859,570 B2 2/2005 Walt et al.
7,057,026 B2 6/2006 Barnes et al.
7,115,400 B1 10/2006 Adessi et al.
7,211,414 B2 5/2007 Hardin et al.
7,315,019 B2 1/2008 Turner et al.
7,329,492 B2 2/2008 Hardin et al.
7,329,860 B2 2/2008 Feng et al.
7,405,281 B2 7/2008 Xu et al.
7,622,294 B2 11/2009 Walt et al.
8,252,911 B2 8/2012 Bjornson et al.
8,530,164 B2 9/2013 Patel et al.
8,951,781 B2 2/2015 Reed et al.
9,073,033 B2 7/2015 Lebl et al.
9,193,996 B2 11/2015 Buermann et al.
9,476,080 B2 10/2016 Li et al.
9,581,550 B2 2/2017 Rulison et al.
10,501,796 B2 12/2019 Buermann et al.
10,858,701 B2 12/2020 Buermann et al.
10,858,703 B2 12/2020 Buermann et al.
2002/0055100 A1 5/2002 Kawashima et al.
2004/0002090 A1 1/2004 Mayer et al.
2004/0096853 A1 5/2004 Mayer
2005/0064460 A1 3/2005 Holliger et al.
2005/0130173 A1 6/2005 Leamon et al.
2005/0142033 A1 * 6/2005 Glezer .................. B01L 3/5085 422/400
2006/0239864 A1 * 10/2006 Ugolin ............. G01N 27/44773 435/287.1
2007/0099208 A1 5/2007 Drmanac et al.
2007/0128624 A1 6/2007 Gormley et al.
2008/0009420 A1 1/2008 Schroth et al.
2008/0108082 A1 5/2008 Rank et al.
2009/0026082 A1 1/2009 Rothberg et al.
2009/0127589 A1 5/2009 Rothberg et al.
2009/0197326 A1 8/2009 El Gamal et al.
2009/0247414 A1 10/2009 Obradovic et al.
2010/0111768 A1 5/2010 Banerjee et al.
2010/0137143 A1 6/2010 Rothberg et al.
2010/0282617 A1 11/2010 Rothberg et al.
2012/0002276 A1 1/2012 Suzuki et al.
2012/0270305 A1 10/2012 Reed et al.
2014/0057339 A1 * 2/2014 Esfandyarpour ............................ G01N 33/54313 435/287.2
2014/0286835 A1 9/2014 Baril
2015/0093303 A1 4/2015 Tsai et al.
2015/0293021 A1 10/2015 Finkelstein et al.
2016/0017416 A1 1/2016 Boyanov et al.
2016/0067709 A1 3/2016 Sun et al.
2016/0076025 A1 3/2016 Boutell et al.
2016/0356715 A1 12/2016 Zhong et al.
2017/0022553 A1 1/2017 Vijayan et al.
2017/0191125 A1 7/2017 Vijayan et al.
2018/0044727 A1 2/2018 Vijayan et al.
2018/0187245 A1 7/2018 Dambacher et al.
2018/0208983 A1 7/2018 Dambacher et al.
2018/0280975 A1 10/2018 Kilcoin et al.
2019/0055596 A1 2/2019 Buermann et al.
2019/0055598 A1 2/2019 Buermann et al.
2019/0212258 A1 * 7/2019 Harrison ................ G01N 21/05
2020/0063201 A1 2/2020 Buermann et al.

FOREIGN PATENT DOCUMENTS

WO WO-00/63437 A2 10/2000
WO WO-2004/018497 A2 3/2004
WO WO-2005/010145 A2 2/2005
WO WO-2005/065814 A1 7/2005
WO WO-2007/095090 A2 8/2007
WO WO-2007/123744 A2 11/2007
WO WO-2012/096703 A1 7/2012
WO WO-2016/154193 A1 9/2016
WO WO-2019/035897 A1 2/2019

OTHER PUBLICATIONS

Anonymous (Sep. 6, 1998). "Molecular Expressions Microscopy Primer: Anatomy of the Microscope-Microscope Stages," located at <https://micro.magnet.fsu.edu/primer/anatomy/stage.html> 7 pages.

Bently, D.R. et al. (Nov. 6, 2008). "Accurate whole human genome sequencing using reversible terminator chemistry," *Nature* 456(7218):53-59.

Dean, F.B. et al. (Apr. 16, 2002). "Comprehensive human genome amplification using multiple displacement amplification," *PNAS USA* 99(8):5261-5266.

Dressman, D. et al. (Jul. 22, 2003, e-published Jul. 11, 2003). "Transforming single DNA molecules into fluorescent magnetic particles for detection and enumeration of genetic variations," *PNAS USA* 100(15):8817-8822.

Kern, M.A. (Sep. 3, 2005). "Stage-extension device for transmission light microscopes," *The Royal Microscopical Society Journal of Microscopy*, 219:157-159.

Korlach, J. et al. (Jan. 29, 2008, e-published Jan. 23, 2008). "Selective aluminum passivation for targeted immobilization of single DNA polymerase molecules in zero-mode waveguide nanostructures," *PNAS USA* 105(4):1176-1181.

Lage, J.M. et al. (Feb. 2003). "Whole genome analysis of genetic alterations in small DNA samples using hyperbranched strand displacement amplification and array-CGH," *Genome Res* 13(2):294-307.

Levene, M.J. et al. (Jan. 31, 2003). "Zero-mode waveguides for single-molecule analysis at high concentrations," *Science* 299(5607):682-686.

Lizardi, P.M. et al. (Jul. 1998). "Mutation detection and single-molecule counting using isothermal rolling-circle amplification," *Nat Genet* 19(3):225-232.

Lundquist, P.M. et al. (May 2008). "Parallel confocal detection of single molecules in real time," *Opt Lett* 33(9):1026-1028.

Walker, G.T. et al. (Apr. 11, 1992). "Strand displacement amplification—an isothermal, in vitro DNA amplification technique," *Nucleic Acids Res* 20(7):1691-1696.

Office Action in EP 21 708 473.0, mailed Jun. 13, 2023, 4 pages.

* cited by examiner

FLOW CELLS AND METHODS FOR THEIR MANUFACTURE AND USE

This application is based on, and claims the benefit of, U.S. Provisional Application No. 62/969,845, filed Feb. 4, 2020, which is incorporated herein by reference.

BACKGROUND

The present disclosure relates generally to analytical chemistry and biology, and has specific applicability to flow cells used for analytical methods such as nucleic acid sequence analyses.

Flow cells are a convenient vessel for multi-step reactions in the modern analytical chemistry or biology laboratory. Flow cells can contain target analytes (e.g., cells, proteins, or nucleic acids) fixed within a chamber, wherein different liquid reagents can be flowed through the chamber and wherein the chamber is configured to facilitate detection of the target analytes. Flowing different reagents in ordered sequence through the flow cell to contact the fixed targets controls the nature of the biochemical reactions that may take place.

Certain next-generation nucleic acid sequencing technologies have been automated to employ flow cells, wherein flow of reagents across a surface attached array of immobilized nucleic acids allows for convenient and efficient reagent exchange in a cyclic fashion. The flow cell is observed, for example, via luminescence microscopy techniques to detect changes in the immobilized nucleic acid features that are indicative of their sequences. Flow cells are typically disposable since they are in direct contact with the analytes that are to be detected, and even a small level of analyte carry-over from a previous procedure can lead to erroneous results. For many procedures, nucleic acid sequencing being exemplary, the flow cell is configured for high precision detection. Even relatively small aberrations in flow cell manufacturing or design can adversely impact the quality of analytical results.

There exists a need for flow cells and methods for their manufacture that are precise enough to support high precision detection yet efficient enough to restrain costs at a level that supports disposable use. The present invention satisfies this need and provides related advantages as well.

BRIEF SUMMARY

The present disclosure provides a flow cell that optionally includes (a) a gasket interposed between a first substrate and a second substrate, wherein the gasket, the first substrate and the second substrate are impermeable to aqueous liquid and liquid adhesive, wherein the gasket has a footprint on the first substrate that delineates a channel for containing the aqueous liquid; (b) a via in the gasket, the via containing a solidified liquid adhesive that bonds the first substrate to the second substrate, wherein the solidified liquid adhesive in the via is separated from the channel by the gasket; and (c) a channel port connecting the channel to the exterior of the flow cell, wherein the channel port is permeable to the aqueous liquid.

The present disclosure also provides a method of making a flow cell. The method can include steps of (a) interposing a gasket between a first substrate and a second substrate to delineate a channel for containing an aqueous liquid, wherein the gasket, the first substrate and the second substrate are impermeable to aqueous liquid and liquid adhesive; (b) delivering a liquid adhesive to a via in the gasket; and (c) allowing the liquid adhesive to bond the first substrate to the second substrate, wherein the liquid adhesive is separated from the channel by the gasket.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1A:
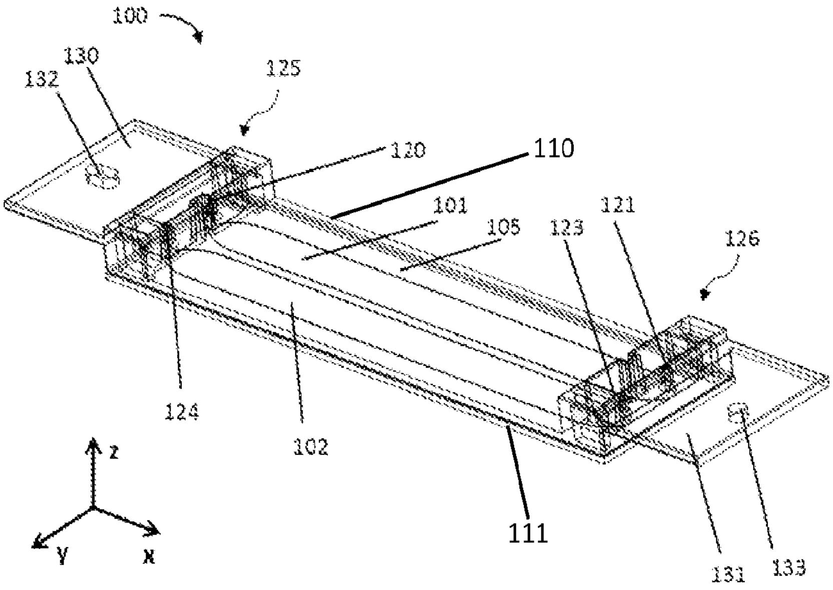
FIG. 1A shows a perspective view of assembled flow cell 100.

This disclosure provides flow cells that are useful for any of a variety of analytical or preparative processes. The flow cells provide high accuracy detection and processing of analytes. High accuracy detection is supported by precise dimensions of the flow cell such as uniform planarity and thickness of the surfaces through which analytes in the flow cell are detected. High accuracy processing of analytes can be achieved due to robust mechanical properties including, for example, ability to withstand high internal fluid pressure and ability to conveniently and reliably connect to fluidic components that deliver reagents to the flow cell.

The present disclosure also provides methods for making flow cells. For example, a method is provided for bonding a gasket between two substrates using a liquid adhesive that adheres to both substrates. Two substrates (e.g. optically transparent glass or plastic) are brought into contact with an interposing gasket layer (e.g. a pressure sensitive adhesive or rubber film). The gasket layer delineates a channel for analytes and the gasket layer can also include one or more vias that pass through the gasket. These vias can be filled with a liquid adhesive by injecting through a via port in one or both of the substrates or directly into the gasket material. In some configurations, a gasket is bonded to substrates due to a combination of liquid adhesive in a via and adhesive at the interfaces of the gasket and the substrates.

Liquid adhesive bonding of flow cells provides a modular method for bonding two substrates especially when creating a microfluidic channel. This modular approach to bonding provides the advantage of separating the geometric properties of flow cell design from the mechanical properties of the flow cell. The gasket layer can define channel geometry (e.g. channel length, width and height), and the liquid adhesive can provide mechanical strength. This modularity allows rapid prototyping and simple manufacturing.

Liquid adhesive bonding of flow cells also allows multiple layers to be bonded together, including dissimilar materials (e.g., glass and plastic). Moreover, fiducials can be created by configuring vias in the gasket to contain a detectable liquid adhesive or other detectable material. For example, one or more vias can contain a luminescent adhesive or other luminescent material. Efficient manufacturing techniques can be used to precisely control the shape of the vias and the placement of the vias relative to sites in the channel where analytes are to be detected. Accordingly, the vias provide a fiducial that can be relied upon during analytical procedures to register analyte sites in the channel. Flow cell fiducials having luminescent vias can be conveniently detected using the same detection hardware used to detect luminescent analytes in the detection channel of the flow cell. For example, luminescence of the material in the via and luminescence of analytes in the detection channel can be achieved using the same excitation wavelengths and the same emission wavelength. More specifically, the same excitation source can be used for the fiducial and the analyte. Alternatively or additionally, the same emission detector can be used for the fiducial and the analyte.

Terms used herein will be understood to take on their ordinary meaning in the relevant art unless specified otherwise. Several terms used herein, and their meanings, are set forth below.

As used herein, the term "array" refers to a population of molecules attached to one or more solid support such that the molecules at one site can be distinguished from molecules at other sites. An array can include different molecules that are each located at different addressable sites on a solid support. Alternatively, an array can include separate solid supports each functioning as a site that bears a different molecule, wherein the different molecules can be identified according to the locations of the solid supports on a surface to which the solid supports are attached, or according to the locations of the solid supports in a liquid such as a fluid stream. The molecules of the array can be, for example, proteins, nucleotides, nucleic acids, nucleic acid primers, nucleic acid templates, primed template nucleic acids, or nucleic acid enzymes such as polymerases, ligases, exonucleases or combinations thereof.

As used herein, the term "attached" refers to the state of two things being joined, fastened, adhered, connected, bonded or bound to each other. For example, a nucleic acid can be attached to a solid support by a covalent or non-covalent bond. Similarly, two nucleic acids can be attached to each other by a covalent (e.g. phosphodiester) bond or by a non-covalent bond (e.g. hydrogen bonding between bases of the two nucleic acids). A covalent bond is characterized by the sharing of pairs of electrons between atoms. A non-covalent bond is a chemical bond that does not involve the sharing of pairs of electrons and can include, for example, hydrogen bonds, ionic bonds, van der Waals forces, hydrophilic interactions and hydrophobic interactions.

As used herein, the term "blocking moiety," when used in reference to a nucleotide, means a part of the nucleotide that inhibits or prevents the 3' oxygen of the nucleotide from forming a covalent linkage to a next correct nucleotide during a nucleic acid polymerization reaction. An exemplary blocking moiety is a reversible terminator moiety. The blocking moiety of a "reversible terminator" nucleotide can be removed from the nucleotide analog, or otherwise modified, to allow the 3'-oxygen of the nucleotide to covalently link to a next correct nucleotide. This process is referred to as "deblocking" the nucleotide analog. Such a blocking moiety is referred to herein as a "reversible terminator moiety." Exemplary reversible terminator moieties are set forth in U.S. Pat Nos. 7,427,673; 7,414,116; 7,057,026; 7,544,794 or 8,034,923; or PCT publications WO 91/06678 or WO 07/123744, each of which is incorporated herein by reference. A nucleotide that has a blocking moiety or reversible terminator moiety can be at the 3' end of a nucleic acid, such as a primer, or can be a monomer that is not covalently attached to a nucleic acid.

As used herein, the term "bond," when used in reference to an adhesive, means the process or result of attaching the adhesive to a substrate. Attachment can occur via mechanical means or a chemical means. An exemplary mechanical means of attachment includes, but is not limited to, the adhesive infiltrating small pores of the substrate. Exemplary chemical means include the formation of covalent bonds between adhesive and substrate, electrostatic forces between adhesive and substrate, van der Waals forces between adhesive and substrate, and hydrogen bonds between adhesive and substrate.

As used herein, the term "catalytic metal ion" refers to a metal ion that facilitates phosphodiester bond formation between the 3'-oxygen of a nucleic acid (e.g., a primer) and the phosphate of an incoming nucleotide by a polymerase. A "divalent catalytic metal cation" is a catalytic metal ion having a valence of two. Catalytic metal ions can be present at concentrations that stabilize formation of a complex between a polymerase, nucleotide, and primed template nucleic acid, referred to as non-catalytic concentrations of a metal ion insofar as phosphodiester bond formation does not occur. Catalytic concentrations of a metal ion refer to the amount of a metal ion sufficient for polymerases to catalyze the reaction between the 3'-oxygen of a nucleic acid (e.g., a primer) and the phosphate moiety of an incoming nucleotide. Exemplary catalytic metal ions include $Mg^{2+}$ and $Mn^{2+}$.

As used herein, the term "channel" means a passage, in or on a substrate, that directs the flow of a fluid. A channel can have the form of a tube within a substrate. Alternatively, a channel can have the form of a furrow or groove on a substrate.

The term "comprising" is intended herein to be open-ended, including not only the recited elements, but further encompassing any additional elements.

As used herein, the term "contiguous," when used in reference to an adhesive that bonds two substrates together, means that an uninterrupted path of adhesive is present between the two substrates. An adhesive will be considered to form a contiguous bond between two substrates so long as at least one uninterrupted path of adhesive occurs between the substrates.

As used herein, the term "each," when used in reference to a collection of items, is intended to identify an individual item in the collection but does not necessarily refer to every item in the collection. Exceptions can occur if explicit disclosure or context clearly dictates otherwise.

As used herein, "equilibrium" refers to a state of balance due to the equal action of opposing forces. For example, a ternary complex formed between a primed template nucleic acid, polymerase, and cognate nucleotide is in equilibrium with non-bound polymerase and non-bound nucleotide when the rate of formation of the ternary complex is balanced by the rate of its dissociation. Under this condition, the reversible binding reaction ceases to change its net ratio of products (e.g. ternary complex) to reactants (e.g. polymerase, nucleotide and nucleic acid). If the rate of a forward reaction (e.g., ternary complex formation) is balanced by the rate of a reverse reaction (e.g., ternary complex dissociation), then there is no net change in the ratio of products to reactants.

As used herein, the term "exogenous," when used in reference to a moiety of a molecule, means a chemical moiety that is not present in a natural analog of the molecule. For example, an exogenous label of a nucleotide is a label that is not present on a naturally occurring nucleotide. Similarly, an exogenous label that is present on a polymerase is not found on the polymerase in its native milieu.

As used herein, the term "extension," when used in reference to a nucleic acid, means a process of adding at least one nucleotide to the 3' end of the nucleic acid. The term "polymerase extension," when used in reference to a nucleic acid, refers to a polymerase catalyzed process of adding at least one nucleotide to the 3' end of the nucleic acid. A nucleotide or oligonucleotide that is added to a nucleic acid by extension is said to be incorporated into the nucleic acid. Accordingly, the term "incorporating" can be used to refer to the process of joining a nucleotide or oligonucleotide to the 3' end of a nucleic acid by formation of a phosphodiester bond.

As used herein, the term "extendable," when used in reference to a nucleotide, means that the nucleotide has an oxygen or hydroxyl moiety at the 3' position, and is capable of forming a covalent linkage to a next correct nucleotide if and when incorporated into a nucleic acid. An extendable nucleotide can be at the 3' position of a primer or it can be a monomeric nucleotide. A nucleotide that is extendable will lack blocking moieties such as reversible terminator moieties.

As used herein, the terms "free" or "non-bound," when used in reference to components that are capable of forming a complex in a binding reaction, refers to components that are not in a bound state. By way of example, an equilibrium binding reaction can include a product (e.g. a ternary complex) and reactants that are not bound up in the product (e.g. free polymerases, free nucleic acids or free nucleotides).

As used herein, a "flow cell" is a reaction chamber that includes one or more channels that direct fluid to a detection zone or reaction zone. The detection zone can be coupled to a detector such that a reaction occurring in the reaction chamber can be observed. For example, a flow cell can contain primed template nucleic acid molecules tethered to a solid phase support, to which nucleotides and ancillary reagents are iteratively applied and washed away. The flow cell can include a transparent material that permits the sample to be imaged after a desired reaction occurs. For example, a flow cell can include a glass or plastic slide containing small fluidic channels through which polymerases, dNTPs and buffers can be pumped. The glass or plastic inside the channels can be decorated with one or more primed template nucleic acid molecules to be sequenced.

As used herein, the term "fluid" refers to a liquid or a gas, that is capable of flowing and that changes its shape to fill a vessel. In many conditions, a fluid will change shape at a steady rate when acted upon by a force tending to change its shape.

As used herein, the term "inhibitory metal ion" refers to a metal ion that, when in the presence of a polymerase enzyme, inhibits phosphodiester bond formation needed for chemical incorporation of a nucleotide into a primer. An inhibitory metal ion may interact with a polymerase, for example, via competitive binding compared to catalytic metal ions. A "divalent inhibitory metal ion" is an inhibitory metal ion having a valence of two. Examples of divalent inhibitory metal ions include, but are not limited to, $Ca^{2+}$, $Zn^{2+}$, $Ni^{2+}$, and $Sr^{2+}$. The trivalent $Eu^{3+}$ and $Tb^{3+}$ ions are inhibitory metal ions having a valence of three.

As used herein, the term "label" refers to a molecule or moiety thereof that provides a detectable characteristic. The detectable characteristic can be, for example, an optical signal such as absorbance of radiation, luminescence or fluorescence emission, luminescence or fluorescence lifetime, luminescence or fluorescence polarization, or the like; Rayleigh and/or Mie scattering; binding affinity for a ligand or receptor; magnetic properties; electrical properties; charge; mass; radioactivity or the like. Exemplary labels include, without limitation, a fluorophore, luminophore, chromophore, nanoparticle (e.g., gold, silver, carbon nanotubes), heavy atom, radioactive isotope, mass label, charge label, spin label, receptor, ligand, or the like.

As used herein, the term "liquid adhesive" means a substance that bonds to a substrate, the substance being in a fluid state when applied to the substrate. The substance need not remain in a fluid state after being activated to adhere to the substrate. Accordingly, a liquid adhesive can be in a non-fluid state (e.g. a "hardened liquid adhesive" or "solidified liquid adhesive") after reacting to bond to a substrate.

As used herein, the term "next correct nucleotide" refers to the nucleotide type that will bind and/or incorporate at the 3' end of a primer to complement a base in a template strand to which the primer is hybridized. The base in the template strand is referred to as the "next base" and is immediately 5' of the base in the template that is hybridized to the 3' end of the primer. The next correct nucleotide can be referred to as the "cognate" of the next base and vice versa. Cognate nucleotides that interact specifically with each other in a ternary complex or in a double stranded nucleic acid are said to "pair" with each other. A nucleotide having a base that is not complementary to the next template base is referred to as an "incorrect", "mismatch" or "non-cognate" nucleotide.

As used herein, the term "nucleotide" can be used to refer to a native nucleotide or analog thereof. Examples include, but are not limited to, nucleotide triphosphates (NTPs) such as ribonucleotide triphosphates (rNTPs), deoxyribonucleotide triphosphates (dNTPs), exogenously labelled nucleotides, or non-natural analogs thereof such as dideoxyribonucleotide triphosphates (ddNTPs) or reversibly terminated nucleotide triphosphates (rtNTPs).

As used herein, the term "polymerase" can be used to refer to a nucleic acid synthesizing enzyme, including but not limited to, DNA polymerase, RNA polymerase, reverse transcriptase, primase and transferase. Typically, the polymerase has one or more active sites at which nucleotide binding and/or catalysis of nucleotide polymerization may occur. The polymerase may catalyze the polymerization of nucleotides to the 3' end of the first strand of the double stranded nucleic acid molecule. For example, a polymerase catalyzes the addition of a next correct nucleotide to the 3' oxygen group of the first strand of the double stranded nucleic acid molecule via a phosphodiester bond, thereby covalently incorporating the nucleotide to the first strand of the double stranded nucleic acid molecule. Optionally, a polymerase need not be capable of nucleotide incorporation under one or more conditions used in a method set forth herein. For example, a mutant polymerase may be capable of forming a ternary complex but incapable of catalyzing nucleotide incorporation. The amount of polymerase in a fluid can be quantified in activity units. For example, a unit of polymerase can be equal to the amount of enzyme catalyzing the incorporation of 10 nmol of dNTP into DNA in 30 min at a particular temperature. For example, thermostable polymerases can be measured at 75° C., whereas thermolabile polymerases can be measured at 37° C.

As used herein, the term "primed template nucleic acid" refers to a nucleic acid hybrid having a double stranded region such that one of the strands has a 3'-end that can be extended by a polymerase. The two strands can be parts of a contiguous nucleic acid molecule (e.g. a hairpin structure) or the two strands can be separable molecules that are not covalently attached to each other.

As used herein, the term "primer" refers to a nucleic acid having a sequence that binds to a nucleic acid sequence at or near a template sequence. Generally, the primer binds in a configuration that allows replication of the template, for example, via polymerase extension of the primer. The primer can be a first portion of a nucleic acid molecule that binds to a second portion of the nucleic acid molecule, the first portion being a primer sequence and the second portion being a primer binding sequence (e.g. a hairpin primer). Alternatively, the primer can be a first nucleic acid molecule that binds to a second nucleic acid molecule having the template sequence (e.g. a dissociable primer). A primer can consist of DNA, RNA or analogs thereof. A primer can be blocked at the 3' end or it can be extendable.

As used herein, the term "site," when used in reference to an array, means a location in an array where a particular molecule is present. A site can contain only a single molecule or it can contain a population of several molecules of the same species (i.e. an ensemble of the molecules). Alternatively, a site can include a population of molecules that are different species (e.g. a population of different template sequences). Sites of an array are typically discrete. The discrete sites can be contiguous or they can have spaces between each other.

As used herein, the term "substrate" refers to a solid support that is insoluble in aqueous liquid. The solid support can be non-porous or porous. The solid support can optionally be capable of taking up a liquid (e.g. due to porosity) but will typically be sufficiently rigid that the solid support does not swell substantially when taking up the liquid and does not contract substantially when the liquid is removed by drying. A nonporous substrate is generally impermeable to liquids or gases. Exemplary substrates include, but are not limited to, glass and modified or functionalized glass, plastics (including acrylics, polystyrene and copolymers of styrene and other materials, polypropylene, polyethylene, polybutylene, polyurethanes, Teflon™, cyclic olefins, polyimides etc.), nylon, ceramics, resins, Zeonor, silica or silica-based materials including silicon and modified silicon, carbon, metals, inorganic glasses, optical fiber bundles, and polymers.

As used herein, the term "surface" refers to a portion of a solid support that contacts a fluid or another solid support. The fluid can be gas or liquid. The surface can be substantially flat or planar. Alternatively, the surface can be rounded or contoured. Exemplary contours that can be included on a surface are wells, depressions, pillars, ridges, channels or the like.

As used herein, the term "ternary complex" refers to an intermolecular association between a polymerase, a double stranded nucleic acid and a nucleotide. Typically, the polymerase facilitates interaction between a next correct nucleotide and a template strand of the primed nucleic acid. A next correct nucleotide can interact with the template strand via Watson-Crick hydrogen bonding. The term "stabilized ternary complex" means a ternary complex having promoted or prolonged existence or a ternary complex for which disruption has been inhibited. Generally, stabilization of the ternary complex prevents covalent incorporation of the nucleotide component of the ternary complex into the primed nucleic acid component of the ternary complex.

As used herein, the term "type" or "species" is used to identify molecules that share the same chemical structure. For example, a mixture of nucleotides can include several dCTP molecules. The dCTP molecules will be understood to be the same type (or species) of nucleotide as each other, but a different type (or species) of nucleotide compared to dATP, dGTP, dTTP etc. Similarly, individual DNA molecules that have the same sequence of nucleotides are the same type (or species) of DNA, whereas DNA molecules with different sequences are different types (or species) of DNA. The term "type" or "species" can also identify moieties that share the same chemical structure. For example, the cytosine bases in a template nucleic acid will be understood to have the same type (or species) of base as each other independent of their position in the template sequence.

As used herein, the term "via," when used in reference to a gasket or other substrate, means a void in or through the substrate. A void that passes through a substrate can have a cross-section that is round, oblong, elliptical, oval, triangular, square, rectangular or polygonal (e.g. wherein the number of sides is greater than 4). The cross-section can be symmetric (e.g. rotationally, reflectionally or translationally symmetric), asymmetric, or elongated (e.g. forming a channel). A via can provide a contiguous passage from a substrate on one side of a gasket to a substrate on another side (e.g. the opposite side) of the gasket.

The embodiments set forth below and recited in the claims can be understood in view of the above definitions.

The present disclosure provides flow cells that can be used for any of a variety of analytical or preparative uses. Characteristics of a flow cell set forth herein can be modified to suit a particular use. Several characteristics of flow cells will be exemplified herein in the context of particular uses. However, those skilled in the art will understand that the exemplified flow cells, and more specifically the exemplified characteristics, can be used for purposes other than those that are explicitly exemplified.

Figure 1B:
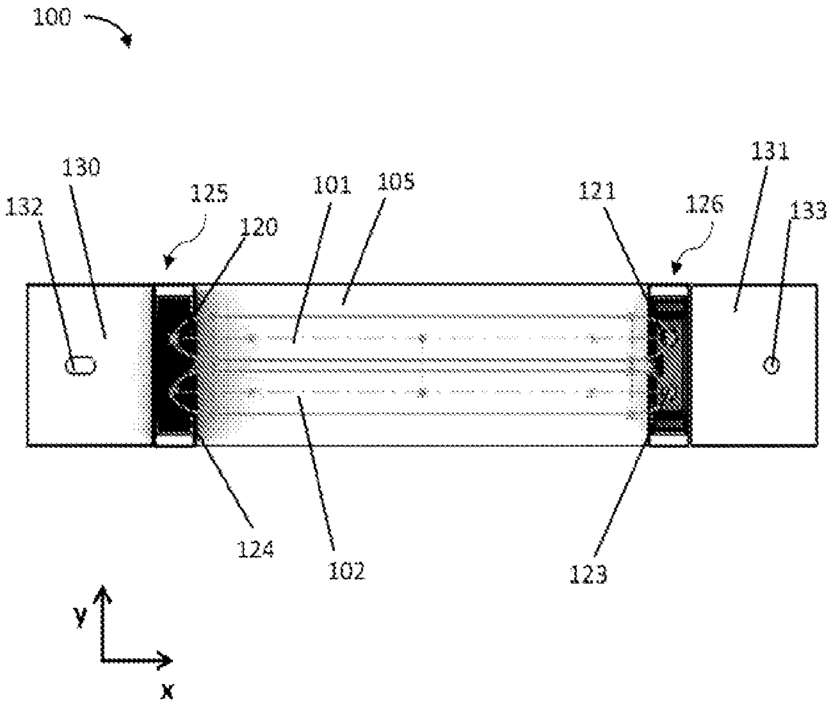
FIG. 1B shows a top view of assembled flow cell 100.

Some useful characteristics for a flow cell are demonstrated by the flow cell shown in perspective view in FIG. 1A and in top view in FIG. 1B. A flow cell can include a detection channel where an analytical reaction of interest can be observed. The flow cell shown in FIGS. 1A and 1B includes two channels 101 and 102. The channels are formed from voids in a spacer 105 that is sandwiched between two optically transparent substrates 110 and 111. Thus, analytes in the channels can be optically detected through the substrates. Fluids can enter and exit channel 101 via channel ports 120 and 121, and fluids can enter and exit channel 102 via channel ports 123 and 124. Channel ports 120 and 124 are housed in receptacle 125 and the channel ports 121 and 123 are housed in receptacle 126. Receptacles 125 and 126 are configured to mate with adapter 1000 (see FIG. 7) which connects the flow cell channels to a fluidic delivery apparatus. The receptacles 125 and 126 are further configured to mate with a pipette adapter 1105, which is configured to facilitate introduction of a nucleic acid library starting materials into the flow cell, as described further below with reference to FIGS. 14A-14B.

The flow cell also includes two wings 130 and 131 which are located in a different z-plane than the channels 101 and 102. The wings include holes 132 and 133, respectively, the holes being configured to engage posts on a sliding rack of an optical detection device (see FIG. 10). The elongated channels can be scanned along their length (i.e. along the x-dimension) to obtain an image of the channel. In some configurations, multiple swaths of the channel are imaged by stepping the flow cell in the y-dimension and then repeating the scan along x to acquire the next swath.

A flow cell of the present disclosure can have one or more openings for transfer of fluids into a channel. In particular configurations, a first opening can function as an ingress for the fluids and a second opening can function as an egress for the fluids. This is exemplified by channel ports 120 and 121 which can function as ingress or egress ports for channel 101. Alternatively, a flow cell can have a single opening that functions as both an ingress and egress. The fluid can be a liquid, gas or mixed-phase fluid (e.g. foam, emulsion or particle slurry). Exemplary apparatus and methods that can be used for producing and manipulating mixed-phase fluids are set forth in U.S. patent application Ser. No. 16/700,422, which is incorporated herein by reference.

An analytical reaction can occur in bulk solution within a flow cell of the present disclosure. For example, two solutions can be mixed and the product of the mixture can be observed in a detection channel. Alternatively, an analytical reaction can occur on a solid support within the detection channel. For example, a solid support that is attached to analytes of interest can be present in channel 101 or 102, a reagent solution can be flowed over the solid support, and a resulting reaction can be observed on the solid support. A flow cell allows convenient fluidic manipulation by passing solutions through a channel port that functions as an ingress, into the detection channel and out of the interior via a channel port that functions as an egress opening. The detection channel also has an observation region (e.g. an observation area or observation volume), for example, being visible through an optically transparent window (e.g. optically transparent substrates 110 and 111). A particularly useful flow cell has a window that is transparent to excitation radiation and emission radiation used for luminescence detection in the UV, VIS or IR regions of the electromagnetic spectrum.

Figure 2A:
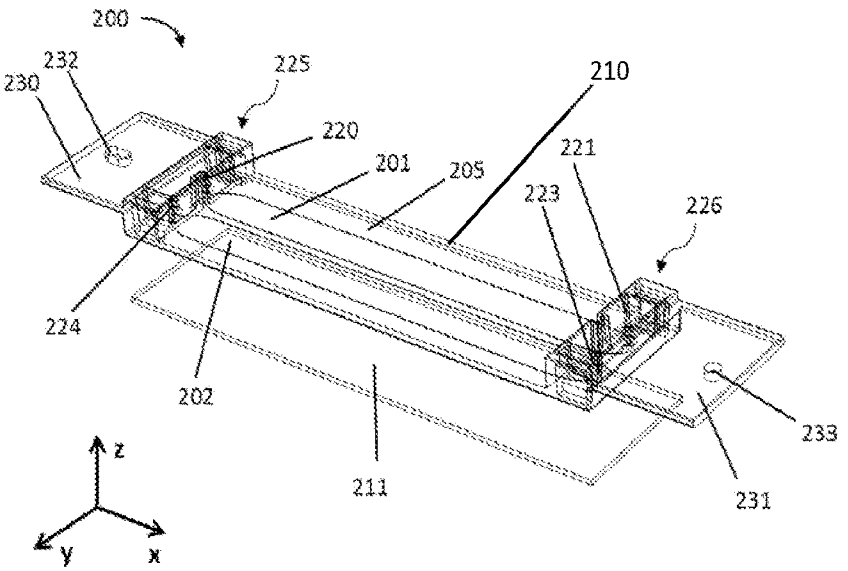
FIG. 2A shows an exploded view of flow cell 200.
Figure 2B:
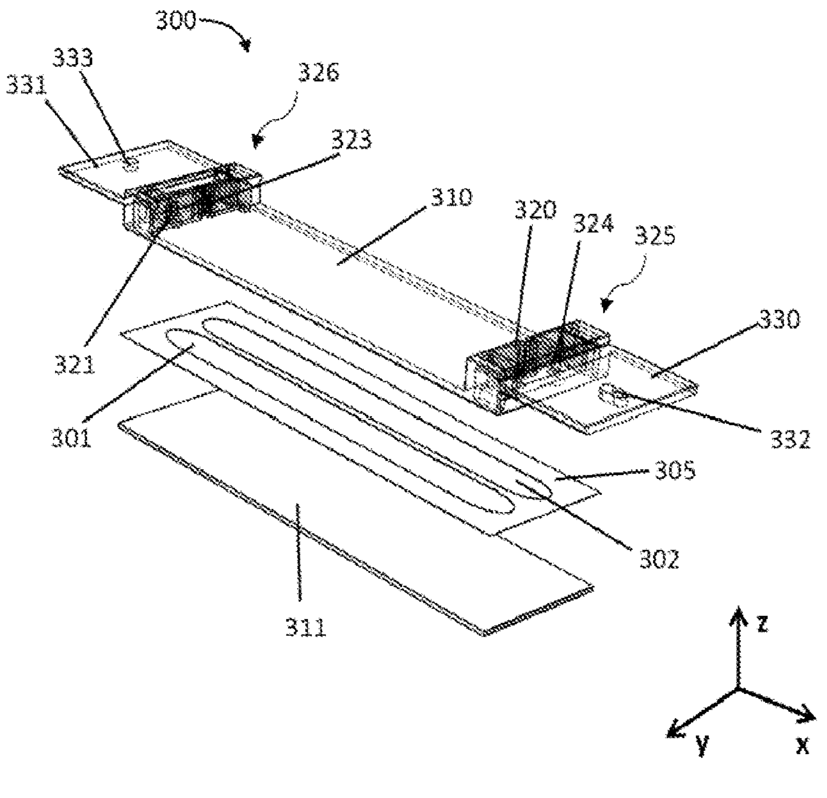
FIG. 2B shows an exploded view of flow cell 300.

As exemplified in FIG. 1 and other figures herein, a flow cell can have one or more detection channels. The detection channel(s) can be closed to atmosphere (or other surrounding environment such as the local environment immediately surrounding the flow cell), for example, forming a tube or tunnel inside of the flow cell structure. The shape of a flow cell channel can derive from the shape of the substrates (e.g. substrates 110 and 111) and the shape of the void area in a spacer used between the substrates (e.g. spacer 105). A spacer can be an integral part of another substrate used to form a flow cell, as exemplified by flow cell 200 shown in FIG. 2A. Alternatively, a spacer can be a gasket that is separable from other substrates as exemplified by flow cell 300 in FIG. 2B.

Flow cell 200 (FIG. 2A) includes a top substrate 210 having a contoured surface with cutouts for channels 201 and 202. The contours on the surface function as a spacer that delineates the x and y dimensions of the channel. Top substrate 210 can be bonded to bottom substrate 211 to create channels having a closed cross-section. Bonding can be achieved using an adhesive or direct chemical bond between the materials of substrates 210 and 211, melting of one or both materials to fuse them together or the like. Channel 201 can be accessed through channel ports 220 and 221 and channel 202 can be accessed through channel ports 223 and 224. The ports are housed in receptacles 225 and 226. Flow cell 200 includes wings 230 and 231 which include holes 232 and 233 respectively for interacting with a post on a scanning rack.

Flow cell 300 (FIG. 2B) includes channels 301 and 302 which are formed by mating top substrate 310 and bottom substrate 311 to gasket 305. Channel 301 can be accessed through channel ports 320 and 321 and channel 302 can be accessed through channel ports 323 and 324. The ports are housed in receptacles 325 and 326. Flow cell 300 includes wings 330 and 331 which include holes 332 and 333 respectively for interacting with posts on a scanning rack.

As exemplified by FIGS. 1 and 2, the depth of channels (in the z dimension) are determined by the thickness of the cutouts in a spacer, whether the spacer be a feature of a substrate (e.g. substrate 210) or a separable gasket (e.g. gasket 305). A gasket or other spacer can have any thickness desired for a particular use including, for example, a thickness of at least 100 μm, 1 mm, 1 cm, 10 cm or more. Alternatively or additionally, the gasket or other spacer can have a thickness of at most 10 cm, 1 cm, 1 mm or 100 μm. A particular advantage of flow cells that are manufactured using liquid adhesives is the ability to withstand high positive pressures. High positive pressures can be useful for flowing fluids through a flow cell having relatively small channel thickness. Accordingly, a gasket or other spacer can have a thickness that is at most 100 μm, 80 μm, 50 μm, 30 μm, 10 μm or lower. Alternatively or additionally, the gasket or other spacer can have a thickness of at least 10 μm, 30 μm, 50 μm, 80 μm or 100 μm.

The xy cross-sectional area of a detection channel in a flow cell of the present disclosure can be at least about 1 $\mu m^2$, 10 $\mu m^2$, 100 $\mu m^2$, 1 $mm^2$, 10 $mm^2$, or 100 $mm^2$ or larger. Alternatively or additionally, the xy cross-sectional area of a detection channel can be at most about 100 $mm^2$, 10 $mm^2$, 1 $mm^2$, 100 $\mu m^2$, 10 $\mu m^2$, 1 $\mu m^2$, or smaller. The volume of a detection channel in a flow cell can be at least about 1 nL, 10 nL, 100 nL, 1 μL, 10 μL, 100 μL, 1 mL or more. Alternatively or additionally, the volume of a detection channel in a flow cell can be at most about 1 mL, 100 μL, 10 μL, 1 μL, 100 nL, 10 nL, 1 nL or less. The length of a flow cell channel can be selected to provide a desired volume, surface area etc. For example, the length of a flow cell channel can be at least 1 mm, 1 cm, 10 cm or longer. Alternatively or additionally, the length of a flow cell channel can be at most 10 cm, 1 cm or 1 mm.

The detection channels exemplified in FIGS. 1 and 2 have a rectangular yz cross-sectional shape due to the flat surfaces of the substrates (in y) and spacers (in z) that form the channels. A flow cell channel can have any of a variety of yz cross-sectional shapes including, for example, circular, oval, triangular, square, rectangular, polyhedral or other closed shapes. The yz cross-section of the detection channel can be uniform (i.e. equivalent area and shape) over its length in x. For example, a detection channel having a circular cross-section that is uniform over the length of the channel will have a cylindrical shape, a detection channel having a rectangular cross-section that is uniform over the length of the channel will have a cuboid shape, and a detection channel having a polyhedral cross-section that is uniform over the length of the channel will have a prism shape. The cross-section of a detection channel need not be uniform in area. For example, a detection channel having a circular cross-sectional area that is increasing or decreasing over the length of the channel will have a conical shape and a detection channel having a square cross-sectional area that is increasing or decreasing over the length of the channel will have a pyramidal shape.

A flow cell channel can further include a region where analytes are detected. A fluid can flow into the flow cell via the ingress, then through the region and then out the egress to exit the flow cell. By way of illustrative example, the region can be examined or detected through a window in the flow cell. For example, an external optical detector can observe an interior region of a flow cell through an optically transparent window of the flow cell such as the windows formed by substrates 110, 111, 210, 211, 310 or 311. One or more regions of a flow cell channel can be examined or observed by techniques other than optical techniques including, for example, detection techniques set forth herein. Accordingly, the flow cell can have a transmission surface that transmits signals from the region of the flow cell to the appropriate detector apparatus. It will be understood that a flow cell need not be configured for detection of analytes. For example, the flow cell can provide a chamber for a reaction to occur and a product of the reaction can flow out of the flow cell for subsequent use or detection. Accordingly, a flow cell need not have an optically transparent window or other surface that is configured for transmitting analytical signals.

The present disclosure provides a flow cell that optionally includes (a) a gasket interposed between a first substrate and a second substrate, wherein the gasket, the first substrate and the second substrate are impermeable to aqueous liquid and liquid adhesive, wherein the gasket has a footprint on the first substrate that delineates a channel for containing the aqueous liquid; (b) a via in the gasket, the via containing a solidified liquid adhesive that bonds the first substrate to the second substrate, wherein the solidified liquid adhesive in the via is separated from the channel by the gasket; and (c) a channel port connecting the channel to the exterior of the flow cell, wherein the channel port is permeable to the aqueous liquid.

The present disclosure also provides a method of making a flow cell. The method can include steps of (a) interposing a gasket between a first substrate and a second substrate to delineate a channel for containing an aqueous liquid, wherein the gasket, the first substrate and the second substrate are impermeable to aqueous liquid and liquid adhesive; (b) delivering a liquid adhesive to a via in the gasket; and (c) allowing the liquid adhesive to bond the first substrate to the second substrate, wherein the liquid adhesive is separated from the channel by the gasket.

An exemplary flow cell that is made using liquid adhesive is shown in FIG. 3. FIG. 3A shows a top view, and FIG. 3B shows a perspective view, of assembled flow cell 500. An exploded view of flow cell 500 is shown in FIG. 3C and a cross-section of flow cell 500 is shown in FIG. 3D. Flow cell 500 includes a main body that includes gasket 505 interposed between substrate 510 and substrate 511. Gasket 505 includes two cutout regions that delineate channels 501 and 502. Gasket 505 can optionally have adhesive on the faces that contact substrates 510 and 511. For example, gasket 505 can include pressure sensitive adhesive (PSA). Gasket 505 and substrates 510 and 511 are impermeable to aqueous liquid. Once assembled channels 501 and 502 are fluid tight except at entry ports 512 through 515. One or both of substrates 510 and 511 can be optically transparent to provide optical detection of channels 501 and 502. In the example of flow cell 500, the footprint of the gasket is the same on both substrates such that the two sides of the channel present the same shaped window. It will be understood that the footprint on the two substrates can be different such that the two sides of the channel present different shaped windows. Gasket 505 need not be optically transparent but can be optically transparent if desired.

Figure 3A:
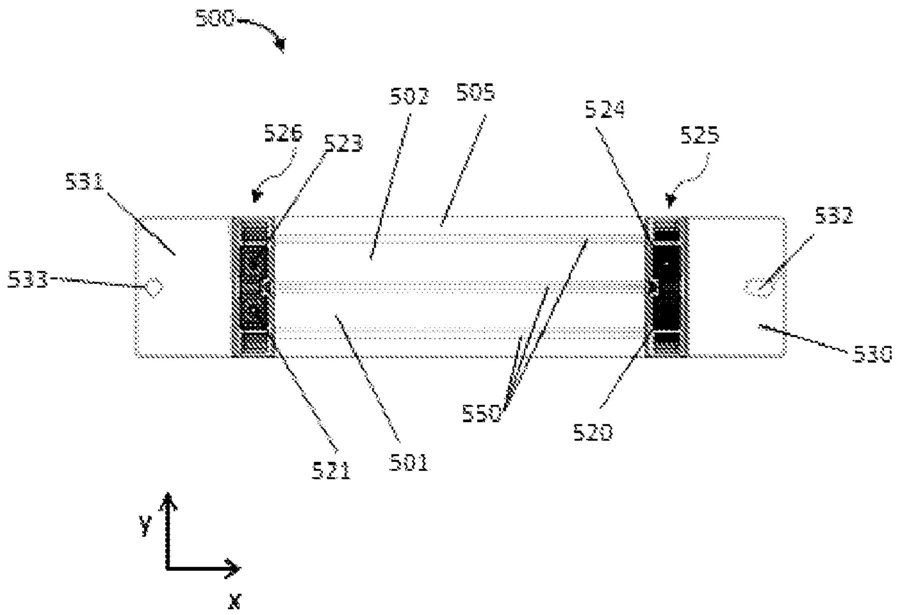
FIG. 3A shows a top view of assembled flow cell 500.
Figure 3B:
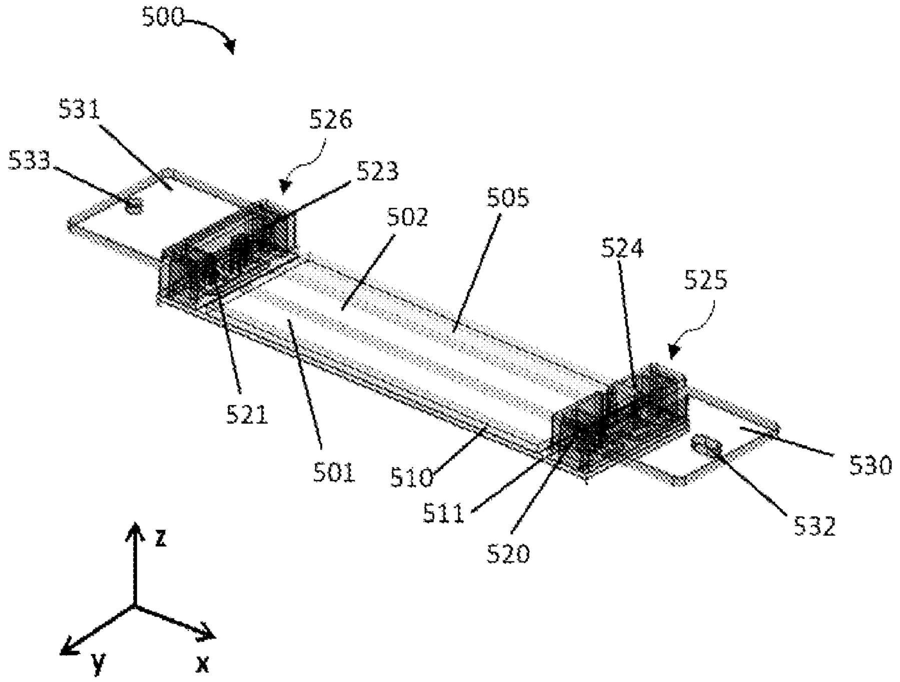
FIG. 3B shows a perspective view of assembled flow cell 500.
Figure 3C:
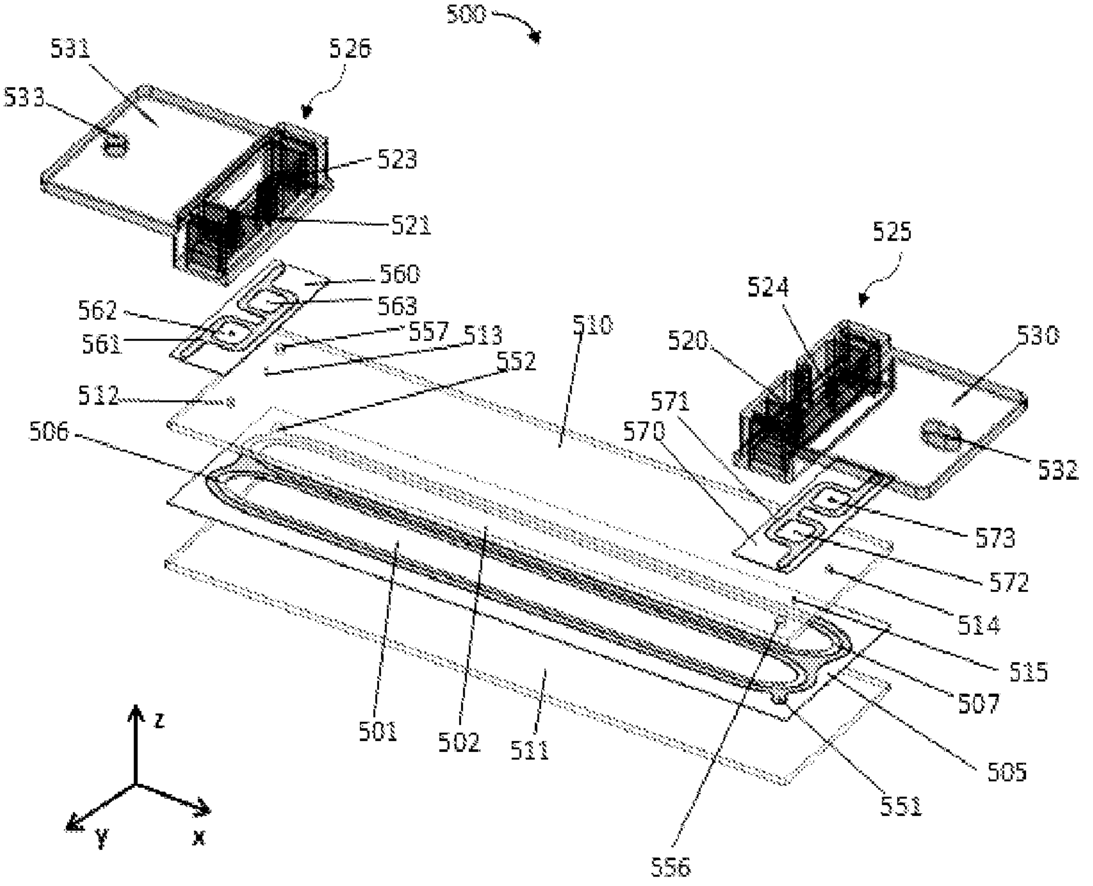
FIG. 3C shows an exploded view of flow cell 500.
Figure 3D:
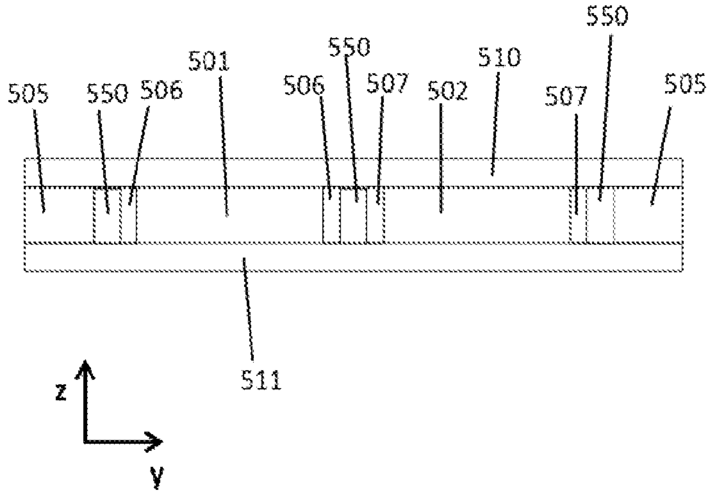
FIG. 3D shows a cross-section of assembled flow cell 500.

Assembled flow cell 500 includes a via 550 that contains a solidified liquid adhesive that bonds substrate 510 to substrate 511. As shown in the view of FIG. 3D, the solidified liquid adhesive in via 550 will have a thickness equivalent to the thickness of gasket 505. Liquid adhesive can be delivered to via 550 through via ports 556 or 557 which interface with elbows 551 and 552, respectively in via 550. Via 550 contiguously encircles channel 501 and also contiguously encircles channel 502. In the xy plane, via 550 has the appearance of a figure eight that forms a moat or channel around each of channels 501 and 502. Thus, the solidified liquid adhesive forms a reinforcing bead that surrounds and strengthens the fluidic impermeability of channels 501 and 502. Via 550 is separated from channel 501 by ribbon 506 of gasket 505, and via 550 is separated from channel 502 by ribbon 507 of gasket 505. Ribbons 506 and 507 prevent liquid adhesive from entering channels 501 and 502 and, conversely, prevent fluids in the channel from contacting the liquid adhesive. As such, the liquid adhesive need not be inert to fluids or fluid components that will be processed in channels 501 and 502.

Wings 530 and 531 are attached to the outer surface of substrate 510 (i.e. opposite the inner surface of substrate

510). Wing 530 is attached to substrate 510 via gasket 570 and solidified liquid adhesive in via 571. Wing 531 is attached to substrate 510 via gasket 560 and solidified liquid adhesive in via 561. Wings 530 and 531 include holes 532 and 533, respectively, for attaching to a rack on a scanning apparatus. Wing 530 includes receptacle 525 which houses channel ports 520 and 524. Channel 501 can be accessed through a path that includes port 520, hole 572 in gasket 570, and hole 515 in substrate 510, and channel 501 can also be accessed through a path that includes port 521, hole 562 in gasket 560, and hole 512 in substrate 510. Channel 502 can be accessed through a path that includes port 524, hole 573 in gasket 570, and hole 514 in substrate 510, and channel 502 can also be accessed through a path that includes port 523, hole 563 in gasket 560, and hole 513 in substrate 510. Via 571 forms a moat surrounding holes 572 and 573 in gasket 570, to form a fluid tight seal between wing 530 and substrate 510. Similarly, via 561 forms a moat surrounding holes 562 and 563 in gasket 560, to form a fluid tight seal between wing 531 and substrate 510.

Figure 4A:
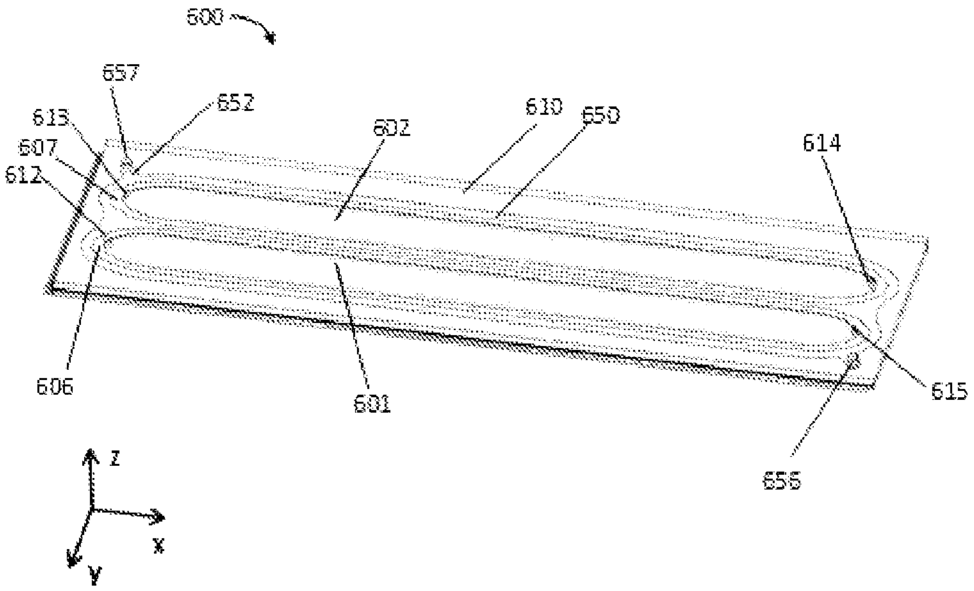
FIG. 4A shows a perspective view of flow cell 600.
Figure 4B:
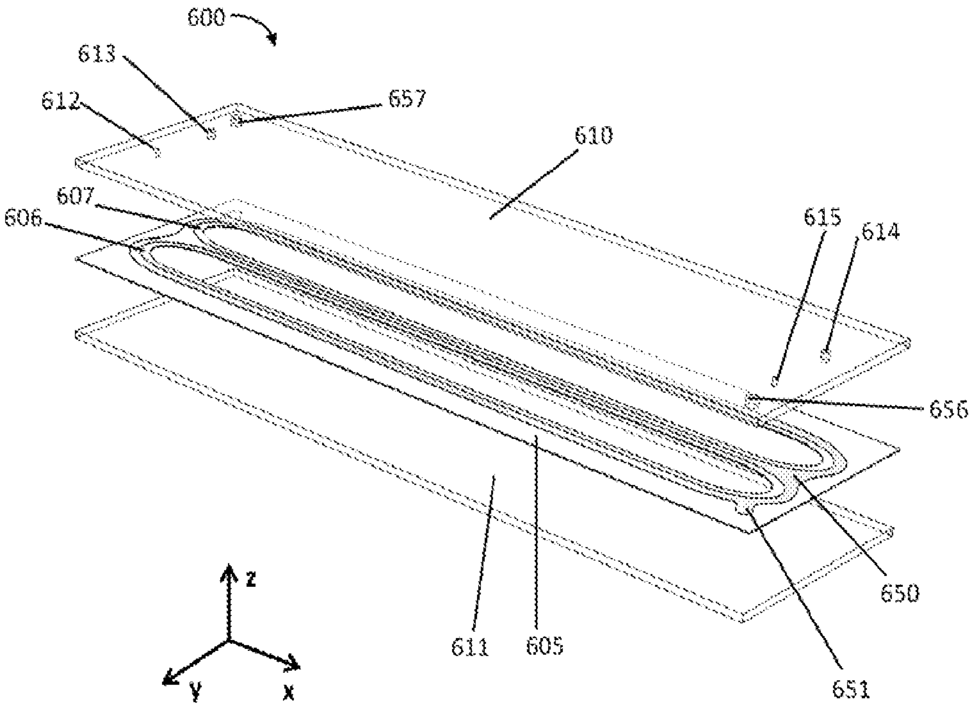
FIG. 4B shows an exploded view of flow cell 600.

As demonstrated by FIG. 4, wings are not a required feature of a flow cell. Flow cell 600 includes a gasket 605 that interposes top substrate 610 and bottom substrate 611. Gasket 605 can optionally be adhered to one or both of top substrate 610 and bottom substrate 611. Cutouts in gasket 605 define channels 601 and 602. Channel 601 can be accessed through ports 612 and 615, whereas channel 602 can be accessed through ports 613 and 614. Assembled flow cell 600 includes a via 650 that contains a solidified liquid adhesive that bonds substrate 610 to substrate 611. The solidified liquid adhesive in via 650 will have a thickness equivalent to the thickness of gasket 605. Liquid adhesive can be delivered to via 650 through via ports 656 or 657 which interface with elbows 651 and 652, respectively in via 650. Via 650 contiguously encircles channel 601 and also contiguously encircles channel 602. The solidified liquid adhesive forms a reinforcing bead that surrounds and strengthens the fluidic impermeability of channels 601 and 602. Via 650 is separated from channel 601 by ribbon 606 of gasket 605, and via 650 is separated from channel 602 by ribbon 607 of gasket 605.

Any of a variety of substrates can be used for a flow cell. Rigid materials can be particularly useful, for example, when a flow cell is likely to be subjected to mechanical stresses. Optionally, the polymeric material is shaped into a substantially rigid configuration. For example, the material can be shaped to have a thickness that resists flexing when used as a planar surface for a flow cell. Planar substrates are useful as exemplified by the figures of the present application. However, the substrates need not be planar and can instead have other shapes that are complemented by a gasket and/or other substrate(s) to form a flow cell channel. In particular configurations, the substrate is made from a material that facilitates transmission of optical signals, for example, in the UV, VIS, and/or IR region of the spectrum. A material can also be selected for its inertness to fluids that will be used in a flow cell. However, in some cases it may be desirable for at least a portion of the surface of the substrate to be reactive to a particular chemical linking procedure. Such procedures are exemplified herein with respect to attaching analytes or arrays of analytes to a substrate.

Exemplary materials that can be useful for the substrates of a flow cell include, but are not limited to, glass, borosilicate glass, silanized glass (e.g. aminosilane, glycidoxysilane or mercaptosilane), silicon, silicon dioxide, metal, carbon fiber, silicon nitride, fused silica, quartz, ceramic, acrylic, plastic or polymer. Particularly useful plastics or polymers include, but are not limited to, polyimide, polybutylene, polybutylene terephthalate (PBT); styrene-butadiene copolymer (SBC); polypropylene, polyethylene, cyclic olefin copolymer (COC); cyclo-olefin polymer (COP); styrene methyl methacrylate (SMMA); polystyrene (PS); polycarbonate (PC); copolyester; polysulfone; nylon; polyether ether ketone (PEEK); acrylonitrile butadiene styrene (ABS); Kapton, and poly(methyl methacrylate) (PMMA).

For flow cells that use two substrates, the first and second substrates can be made from the same material. For example, both substrates can be glass, or both can be the same plastic (e.g. both substrates can be COP). Alternatively, the material for the two substrates can differ from each other. For example, one substrate can be glass and the other can be COP. Generally, it is preferable to select materials having similar coefficients of thermal expansion (CTE) to avoid warpage if the bonded flow cell experiences substantial temperature changes. However, materials having different CTE from each other can be accommodated by use of a thermal expansion joint as set forth in further detail below for example in connection with FIG. 12A and FIG. 12B.

A gasket or spacer used for a flow cell can be made from any of a variety of materials. Useful materials can be inert to the fluids that will be used in the flow cell. The materials used for a gasket can be transparent to optical signals, but need not be transparent for certain uses of a flow cell. For many uses, the material used for a gasket or spacer will be non-compressible or non-elastic, whereby the gasket maintains a fixed distance between two substrates when used as a spacer. The material used for a gasket can advantageously have a similar CTE as materials used for one or more other substrates in a flow cell. This can be beneficial to avoid warpage or breakage when the flow cell is subjected to substantial temperature changes. A gasket or spacer can include an adhesive surface, for example, to adhere to a substrate used in a flow cell herein. For example, a gasket can have a pressure sensitive adhesive on a surface that interfaces with one or more substrates to which the gasket bonds.

Exemplary materials for use in a gasket or spacer include, but are not limited to, the materials set forth above for substrates. Particularly useful materials include, for example, rubber, polytetrafluoroethylene (e.g. Teflon), polyethylene terephthalate (PET), polyimide, acrylic-based adhesives, silicon-based adhesives, polydimethylsiloxane (PDMS), glass, latex. Elastomers are useful, for example, as gaskets for creating a tight seal with relatively rigid materials. The gasket used for a particular flow cell may be the same material as one or both substrates or, alternatively, the gasket can be a different material from the substrates.

A liquid adhesive can be selected for its ability to bind to the materials used as substrates in a flow cell. For flow cell configurations in which liquid adhesive is present in a via that connects two substrates, the adhesive can bond to the two substrates to assemble the flow cell. In this configuration, the adhesive need not bond to the gasket. However, a liquid adhesive can be selected for its ability to bond to the substrates and to the gasket if desired. A liquid adhesive can be selected based on the method of curing or solidifying the adhesive. For example, a UV cure adhesive can be useful when the materials or contents of a flow cell are adversely impacted by chemical-based or heat-based curing techniques used for other adhesives. Low outgassing or even absence of outgassing can be a desirable characteristic of a liquid adhesive, for example, when vacuum is used to draw adhesive into a via, or when venting is not convenient. A liquid adhesive can also be selected based on compatibility of the adhesive, or compatibility of the carrier solvent, with regard to the structural or chemical integrity of the flow cell or its contents. In some cases, it is desirable to use a liquid adhesive that does not expand or contract upon curing. For example, an adhesive that experiences less than 10% or even less than 1% expansion or contraction can be particularly useful. However, in other cases, expansion may be desirable, for example, to help the adhesive invade contours of a surface. Contraction may be desirable to draw substrates together upon curing or to avoid warping substrates due to the volume of the liquid adhesive. In some configurations, low viscosity is desirable for the liquid adhesive since this will facilitate delivery of the adhesive by allowing it to flow into vias or other physical features of substrates that are to be adhered.

Useful liquid adhesives include, but are not limited to epoxy, light-cure adhesive (e.g. UV cure adhesives), and heat cure adhesives. Optionally, the liquid adhesive can be bonded by heat treatment, for example in an oven, exposure to UV light, or other treatment appropriate to bonding the adhesive.

As demonstrated by the flow cells of FIGS. 3 and 4, a via that contains liquid adhesive can be configured as a moat that surrounds a channel or other space that contains a fluid. As such, the liquid adhesive forms a contiguous bead around a feature of interest in the flow cell. Alternatively, a plurality of liquid adhesive-filled vias can be positioned near a channel or other feature of a flow cell. As such, the liquid adhesive can form a set of discrete adhesive fasteners akin to adhesive rivets. For example, a plurality of liquid-adhesive filled vias can surround a flow cell channel instead of the continuous bead shown in FIG. 3.

Figure 5A:
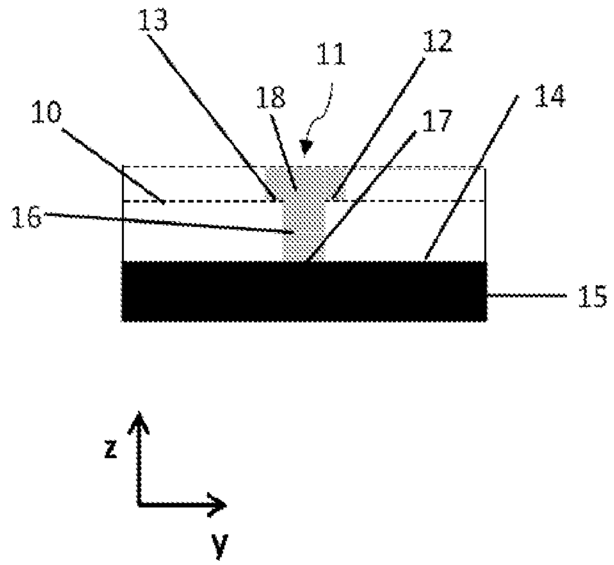
FIG. 5A shows an adhesive rivet that bonds an adhering material to a non-adhering material.

A liquid adhesive rivet need not adhere to all materials that are to be attached to each other. Rather, a liquid adhesive can be solidified to form a solid material that holds two or more materials together using mechanical means. FIG. 5A shows a cross-section of a solidified liquid adhesive rivet 11 that adheres to a first substrate 15 but does not necessarily adhere to a second substrate 10. Nevertheless, the liquid adhesive rivet 11 connects substrate 15 to substrate 10 by a combination of adhering to substrate 15 and providing a mechanical coupling to substrate 10. More specifically, the liquid adhesive rivet solidifies to have a surface 17 that adheres to substrate 15, a shaft 16 that is relatively inelastic and a head 18 that contacts a seat on substrate 10 (shown as ridges 12 and 13 in the cross-section view of FIG. 5A). The rivet 11 holds the substrates together by the combined forces of adhesion of the rivet 11 to surface 17, mechanical force of head 18 of the rivet 11 on the seat of substrate 10, and the inelastic rigidity of the solidified liquid adhesive 11 against stretching or fracturing.

Figure 5B:
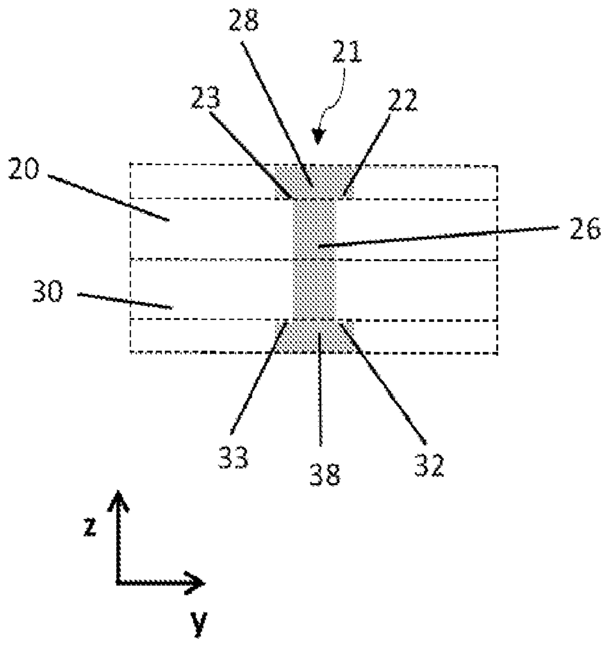
FIG. 5B shows an adhesive rivet that bonds two non-adhering materials together.

FIG. 5B shows a cross-section of a solidified liquid adhesive rivet 21 that does not necessarily adhere to either substrate 20 or to substrate 30, but nevertheless attaches the two substrates together via mechanical forces. More specifically, the liquid adhesive rivet solidifies to have a first head 28 that contacts a seat on substrate 20 (shown as ridges 22 and 23 in the cross-section view of FIG. 5B), a shaft 26 that is relatively inelastic, and a second head 38 that contacts a seat on substrate 30 (shown as ridges 32 and 33 in the cross-section view of FIG. 5B). The rivet 11 holds the substrates together by the combined forces of mechanical force of head 28 of the rivet 21 on the seat of substrate 20, the inelastic rigidity of the solidified liquid adhesive 21 against stretching or fracturing, and mechanical force of head 38 of the rivet 21 on the seat of substrate 30.

Figure 13A:
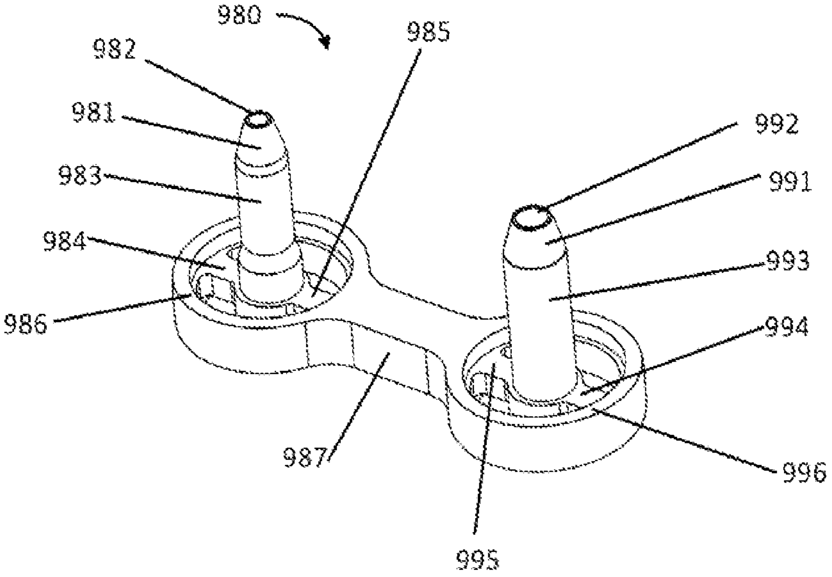
FIG. 13A shows a top perspective view of a dual port for a flow cell.
Figure 13B:
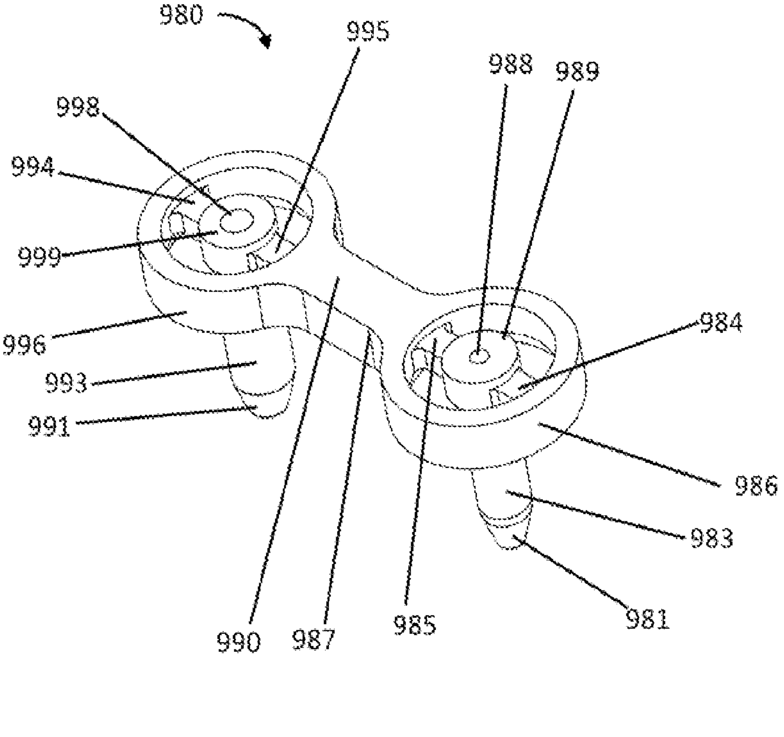
FIG. 13B shows a bottom perspective view of a dual port for a flow cell.

A further example of an adhesive bond that provides mechanical means for bonding two components is provided by the dual port component 980 shown in FIG. 13A and FIG. 13B. The dual port component 980 includes two ports 983 and 993 that are connected to each other via a base 987. Port 983 has a primarily cylindrical body with an opening 982 at the narrowed end of a conical region 981. Port 993 has a similar shape, a primarily cylindrical body with an opening 992 at the narrowed end of a conical region 991. The cylindrical exterior of each port is shaped to complement the inner diameter of a flexible tube to form a tight fit between the port and tube. The conical shape around the opening of each port provides ease of inserting the port into the tube. The ports 983 and 993 are held at a fixed orientation and distance from each other by base 987. The underside 990 of base 987, and the undersides 989 and 999 of ports 983 and 993, respectively, have a flat shape that can form a tight seal with the top of a flow cell. The flat underside 989 of port 983 surrounds opening 988, and the flat underside 999 of port 993 surrounds opening 998. Openings 988 and 998 can be aligned to holes in a flow cell, and the flat surrounds 989 and 999 can form a tight seal with the outer surface of the flow cell. As such, fluid can pass from a tube into opening 982, through the inner channel of port 983, out opening 988 and into a channel of the flow cell via a hole in the upper substrate of the flow cell. Similarly, fluid can pass from a tube into opening 992, through the inner channel of port 993, out opening 998 and into a channel of the flow cell via a hole in the upper substrate of the flow cell.

Adhesion of the dual port component 980 to the surface of a flow cell is facilitated by wells 986 and 996 that are formed in base 987. Wells 986 and 996 surround ports 983 and 993 respectively. Wells 986 and 996 can be filled with an adhesive that bonds to the flow cell surface. The adhesive can bond to the flow cell surface and to the inner surface of wells 986 and 996 in order to adhere the dual port component to the flow cell surface. As shown in FIGS. 13A and 13B, well 986 contains spokes 984 and 985, which are inset within the well such that filling the well with adhesive will encapsulate the spokes within the adhesive. Well 996 contains spokes 994 and 995, which perform a similar function. So long as the adhesive bonds to the flow cell surface, the spokes and wells need not bond chemically to the adhesive. Rather, the encapsulation of the spokes in the adhesive will provide a mechanical means of adhesion. Other features besides spokes can be embedded in liquid adhesive to provide these mechanical forces.

Any of a variety of analytes can be present in a flow cell set forth herein. Exemplary analytes include, but are not limited to, the analytes exemplified herein or in references cited herein. Particularly useful analytes participate in nucleic acid sequencing processes. Accordingly, a flow cell can contain one or more nucleic acids, polymerases, polymerase inhibitors, polymerase cofactors (e.g. catalytic metal ions), ternary complex stabilizing agents (e.g. inhibitory metal ions), nucleotides, nucleic acid binding proteins, nucleotide deblocking reagents, or the like.

Other analytes that can be present in a flow cell include, for example, biological tissues, biological cells; organelles; protein-based enzymes; protein-based receptors such as antibodies, lectins, or streptavidin; peptides; RNA molecules; aptamers or the like. Exemplary protein-based enzymes that can be used include, but are not limited to, polymerase, transposase, ligase, recombinase, kinase, phosphatase, exonuclease, endonuclease, sulfurylase, apyrase, luciferase, green fluorescent protein (GFP), or phycobiliprotein (e.g. phycocyanin, allophycocyanin, or phycoerythrin).

In some configurations, a flow cell includes a ternary complex (e.g. a stabilized ternary complex) immobilized inside the flow cell, wherein the ternary complex (e.g. stabilized ternary complex) includes a polymerase, a primed template nucleic acid and a next correct nucleotide for the template.

A flow cell can include an array of nucleic acids, proteins or other analytes. In particular configurations, ternary complexes (e.g. stabilized ternary complexes) are present at one or more sites of an array. Arrays provide an advantage of multiplex processing of analytes, whereby the multiple different types of analytes are manipulated or detected in parallel. An array can include at least 2, 10, 100, $1\times10^3$, $1\times10^4$, $1\times10^5$, $1\times10^6$, $1\times10^9$, or more different analyte sites. Alternatively or additionally, an array can include at most $1\times10^9$, $1\times10^6$, $1\times10^5$, $1\times10^4$, $1\times10^3$, 100, 10, 2 or fewer, different analyte sites.

An array useful herein can have, for example, sites that are separated by less than 100 microns, 50 microns, 10 microns, 5 microns, 1 micron, or 0.5 micron. Alternatively or additionally, an array can have sites that are separated by greater than 0.5 micron, 1 micron, 5 microns, 10 microns, 50 microns or 100 microns. The sites can each have an area of less than 1 square millimeter, 500 square microns, 100 square microns, 25 square microns, 1 square micron or less. The density of sites of sites in an array can be, for example, at least about 10 sites/$cm^2$, 100 sites/$cm^2$, $1\times10^3$ sites/$cm^2$, $1\times10^4$ sites/$cm^2$, $1\times10^5$ sites/$cm^2$, $1\times10^6$ sites/$cm^2$, or higher.

An array can be attached to an inner surface of a flow cell wall or to a solid support inside of a flow cell. The flow cell or solid support can be made from any of a variety of materials used for analytical biochemistry. Suitable materials may include glass, polymeric materials, silicon, quartz (fused silica), borofloat glass, silica, silica-based materials, carbon, metals, an optical fiber or bundle of optical fibers, sapphire, or plastic materials. The material can be selected based on properties desired for a particular use. For example, materials that are transparent to a desired wavelength of radiation are useful for analytical techniques that will utilize radiation at that wavelength. Conversely, it may be desirable to select a material that does not pass radiation of a certain wavelength (e.g. being opaque, absorptive or reflective). Other properties of a material that can be exploited are inertness or reactivity to certain reagents used in a downstream process, such as those set forth herein, or ease of manipulation, or low cost of manufacture.

A particularly useful solid support for use in a flow cell or other vessel is a particle such as a bead or microsphere. Populations of beads can be used for attachment of populations of analytes such as stabilized ternary complexes or components capable of forming the complexes (e.g. polymerases, templates, primers or nucleotides). In some configurations, each bead has a single type of stabilized ternary complex or a single type of component capable of forming the complex or a single type of some other analyte set forth herein or in references cited herein. For example, an individual bead can be attached to a single type of ternary complex, a single type of template allele, a single type of template locus, a single type of primer, or a single type of nucleotide. Alternatively, different types of components need not be separated on a bead-by-bead basis. As such, a single bead can bear multiple different types of ternary complexes, template nucleic acids, primers, primed template nucleic acids and/or nucleotides. The composition of a bead can vary, depending for example, on the format, chemistry and/or method of attachment to be used. Exemplary bead compositions include, for example, plastics, ceramics, glass, polystyrene, melamine, methyl styrene, acrylic polymers, paramagnetic materials, thoria sol, carbon graphite, titanium dioxide, controlled pore glass (CPG), latex or cross-linked dextrans such as Sepharose™, cellulose, nylon, cross-linked micelles and Teflon™, as well as other materials set forth in "Microsphere Detection Guide" from Bangs Laboratories, Fishers Ind., which is incorporated herein by reference.

Beads can have a symmetrical shape, such as spherical, polyhedral, cylindrical or the like. Alternatively, beads can have an irregular or non-symmetric shape. Exemplary sizes for beads used herein can have average diameter that is at least about 10 nm, 100 nm, 1 μm, 5 μm, 10 μm, 100 μm, 1 mm or larger. Alternatively or additionally, beads used herein can have average diameter that is at most about 1 mm, 100 μm, 10 μm, 5 μm, 1 μm, 100 nm, 10 nm, 1 nm or smaller. Beads in these size ranges can be used as array features or as particles in a fluid slurry.

Exemplary compositions and techniques that can be used to make an array of beads include, without limitation, those used for BeadChip™ Arrays available from Illumina, Inc. (San Diego, CA) or those described in U.S. Pat. Nos. 6,266,459; 6,355,431; 6,770,441; 6,859,570; or 7,622,294; or PCT Publication No. WO 00/63437, each of which is incorporated herein by reference. Beads can be located at discrete locations, such as wells, on a solid support, whereby each location accommodates a single bead. Alternatively, discrete locations where beads reside can each include a plurality of beads as described, for example, in U.S. Pat. App. Pub. Nos. 2004/0263923 A1, 2004/0233485 A1, 2004/0132205 A1, or 2004/0125424 A1, each of which is incorporated herein by reference.

Other useful arrays include those that are used in nucleic acid sequencing applications. For example, arrays that are used to immobilize amplicons of genomic fragments (often referred to as clusters) can be particularly useful. Examples of nucleic acid sequencing arrays that can be used herein include those described in Bentley et al., *Nature* 456:53-59 (2008), PCT Pub. Nos. WO 91/06678; WO 04/018497 or WO 07/123744; U.S. Pat. Nos. 7,057,026; 7,211,414; 7,315,019; 7,329,492 or 7,405,281; or U.S. Pat. App. Pub. No. 2008/0108082, each of which is incorporated herein by reference.

Nucleic acids or other analytes can be attached to an array in a way that provides detection at a single molecule level or at an ensemble level. For example, a plurality of different nucleic acids can be attached to an array in a way that an individual stabilized ternary complex that forms on one nucleic acid molecule in the array can be distinguished from all neighboring ternary complexes that form in the array. Alternatively, an array of the present disclosure can include a plurality of ensembles, an ensemble being a population of analytes of the same type such as a population of nucleic acids having a common template sequence. An array can have a plurality of ensembles, each of the ensembles being formed using methods known in the art such as bridge amplification, emulsion PCR or other methods set forth herein.

A flow cell of the present disclosure, for example, a flow cell that is bonded using a solidified liquid adhesive can provide advantages of withstanding high positive pressures. This can be beneficial when using positive pressure to drive a fluid through the flow cell. Positive pressure is particularly useful for driving a mixed-phase fluid (e.g. foam, emulsion or particle slurry) through a flow cell. Exemplary mixed phase fluids and methods that employ such fluids in flow cells are set forth in U.S. patent application Ser. No. 16/700,422, which is incorporated herein by reference. A flow cell of the present disclosure can be configured to withstand pressures that are greater than 5 PSI, 10 PSI, 50 PSI, 90 PSI or higher.

A flow cell of the present disclosure can be configured for use in any of a variety of analytical systems. An analytical system of the present disclosure can optionally include an optical detection system configured to detect the inside of a flow cell such as the inside of a detection channel in a flow cell. Particularly useful optical detection systems include those that are found in sub-systems or components of nucleic acid sequencing systems. Several such detection apparatus are configured for optical detection, for example, detection of luminescence signals. Accordingly, an optical detection system can include an excitation system configured to irradiate the inside of a flow cell channel. The optical detection system can further include an emission system configured to detect luminescence from the inside of the flow cell channel. Detection of luminescence can be carried out using methods known in the art pertaining to nucleic acid arrays or nucleic acid sequencing. A luminophore can be detected based on any of a variety of luminescence properties including, for example, emission wavelength, excitation wavelength, fluorescence resonance energy transfer (FRET) intensity, quenching, anisotropy or lifetime.

Examples of nucleic acid sequencing systems and components thereof that can be used with a flow cell of the present disclosure are described, for example, in US Pat. App. Pub. No. 2010/0111768 A1 or U.S. Pat. Nos. 7,329,860; 8,951,781 or 9,193,996, each of which is incorporated herein by reference. Other nucleic acid sequencing systems include those commercialized for nucleic acid sequencing such as those provided by Illumina™, Inc. (e.g. HiSeq™, MiSeq™, NextSeq™, or NovaSeq™ systems), Life Technologies™ (e.g. ION TORRENT™, or SOLiD™ systems), Pacific Biosciences (e.g. systems using SMRT™ Technology such as the Sequel™ or RS II™ systems), or BGI (e.g. DNBSEQ™ systems). Other useful detectors that can be used with a flow cell of the present disclosure are described in U.S. Pat. Nos. 5,888,737; 6,175,002; 5,695,934; 6,140,489; or 5,863,722; or US Pat. Pub. Nos. 2007/007991 A1, 2009/0247414 A1, or 2010/0111768; or WO2007/123744, each of which is incorporated herein by reference in its entirety.

Although the system and methods of the present disclosure are illustrated in the context of optical detection in several exemplary embodiments herein, it will be understood that other detection modalities can be used in addition or instead. For example, the detector can be an electronic detector used for detection of protons or pyrophosphate (see, for example, US Pat. App. Pub. Nos. 2009/0026082 A1; 2009/0127589 A1; 2010/0137143 A1; or 2010/0282617 A1, each of which is incorporated herein by reference in its entirety, or the Ion Torrent™ systems commercially available from ThermoFisher, Waltham, MA) or as used in detection of nanopores such as those commercialized by Oxford Nanopore™, Oxford UK (e.g. MinION™ or PromethION™ systems) or set forth in U.S. Pat. No. 7,001,792; Soni & Meller, *Clin. Chem.* 53, 1996-2001 (2007); Healy, *Nanomed.* 2, 459-481 (2007); or Cockroft, et al. *J. Am. Chem. Soc.* 130, 818-820 (2008), each of which is incorporated herein by reference. A FET detector can be used such as one or more of those described in U.S. Pat. App. Ser. No. 62/767,712; US Pat. App. Pub. Nos. 2017/0240962 A1, 2018/0051316 A1, 2018/0112265 A1, 2018/0155773 A1 or 2018/0305727 A1; or U.S. Pat. Nos. 9,164,053, 9,829,456, 10,036,064, or 10,125,391, each of which is incorporated herein by reference.

Figure 6:
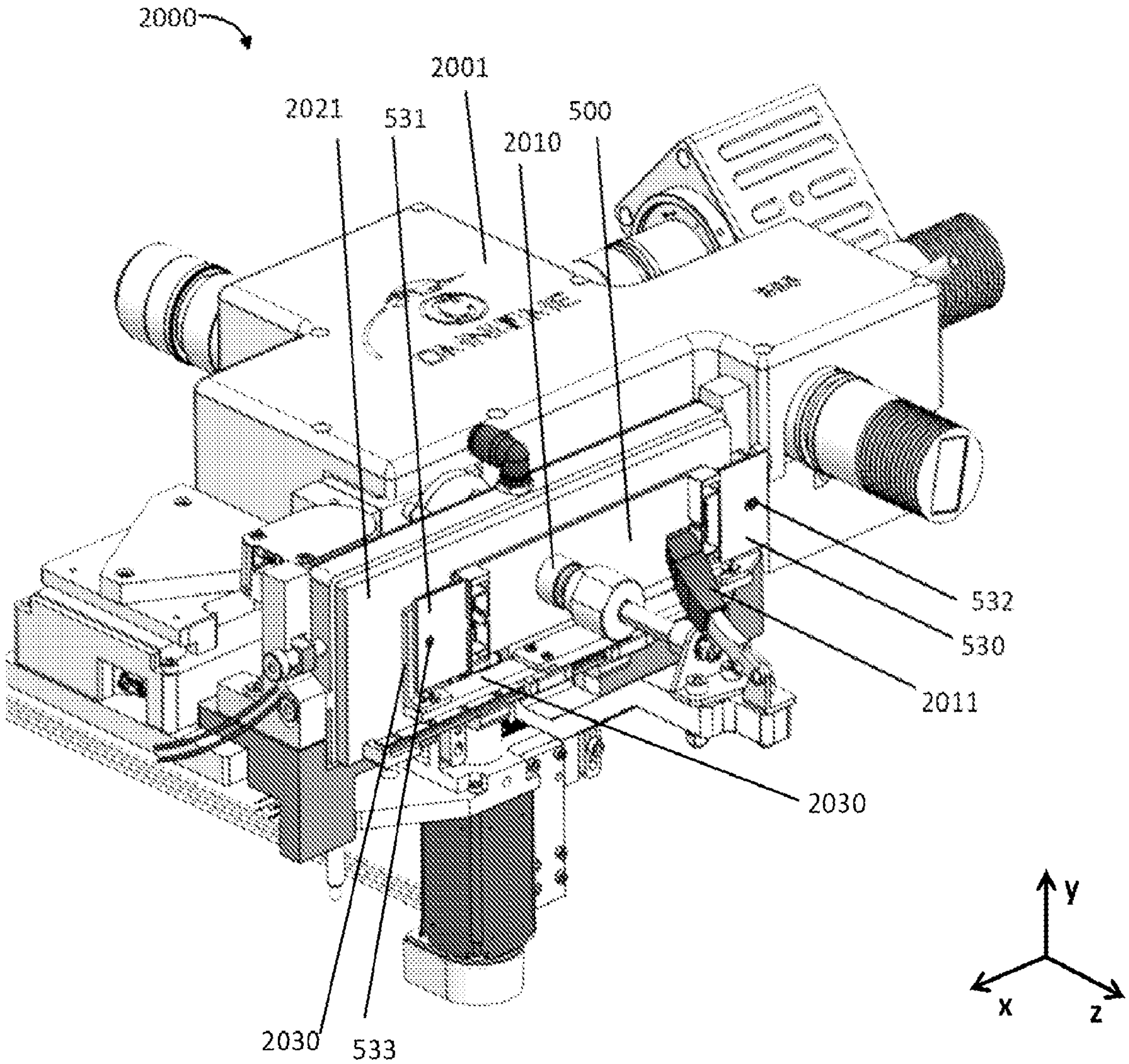
FIG. 6 shows a flow cell mounted on an optical detection system

FIG. 6 shows flow cell 500 mounted on optical detection system 2000. Holes 532 and 533, which pass through wings 530 and 531, respectively, engage posts on rack 2030. Hole 533 is round and engages relatively tightly with a round post on rack 2030, whereas hole 532 has an elongated shape allowing latitude when placing flow cell 500 on the rack 2030. When on rack 2030, flow cell 500 can be pushed against a reference surface on backplate 2021 by the pushing force of preload 2010. The preload can be engaged and disengaged by hand using lever 2011. The rack 2030 slides flow cell 500 along the x dimension to scan a swath of a flow cell channel and rack 2030 is also configured to step flow cell 500 in they direction to enable other swaths of the channel to be scanned along the x dimension. Focusing is achieved by moving an objective component within the optical apparatus 2001 relative to backplate 2021. Components and methods of use for the type of optical detection system exemplified in FIG. 6 are set forth in U.S. Pat. No. 10,501,796 and U.S. patent application Ser. No. 16/700,422, each of which is incorporated herein by reference.

As demonstrated by the example of FIG. 6 and by systems set forth in U.S. Pat. No. 10,501,796 and U.S. patent application Ser. No. 16/700,422 (each of which is incorporated herein by reference), a flow cell can be a removable component of a fluidic system. For example, a system of the present disclosure can include a stage that is configured for convenient placement and removal of the flow cell. Thus, the flow cell can be a consumable component that is dedicated for use in a first analytical test and then removed to be replaced by a second flow cell used for a second analytical test. The two flow cells can be configured similarly to each other, for example, containing similar analytes, similar samples or sub-fractions of a particular sample. Alternatively, a flow cell can be a fixed component of a fluidic system, for example, requiring specialized tools and/or specialized training to remove.

Figure 7A:
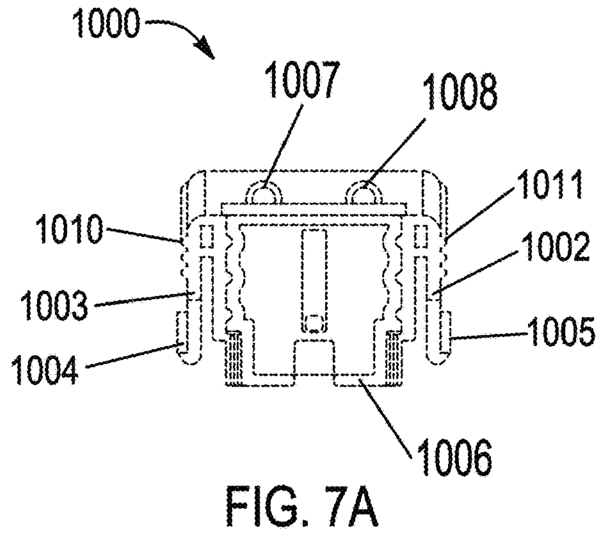
FIG. 7A shows a top perspective view of a fluidic connector.
Figure 7B:
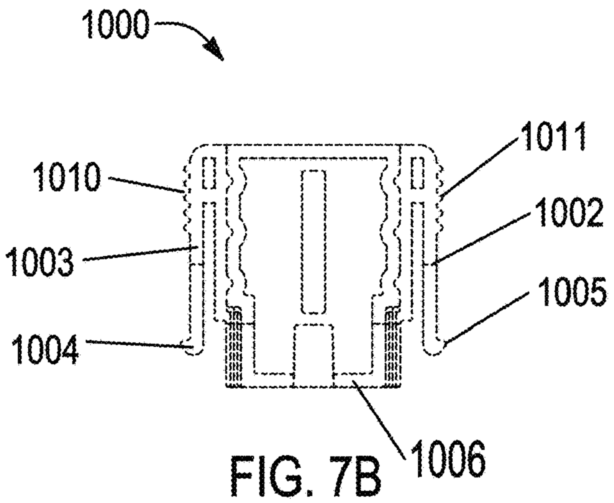
FIG. 7B shows a side view of a fluidic connector.
Figure 7C:
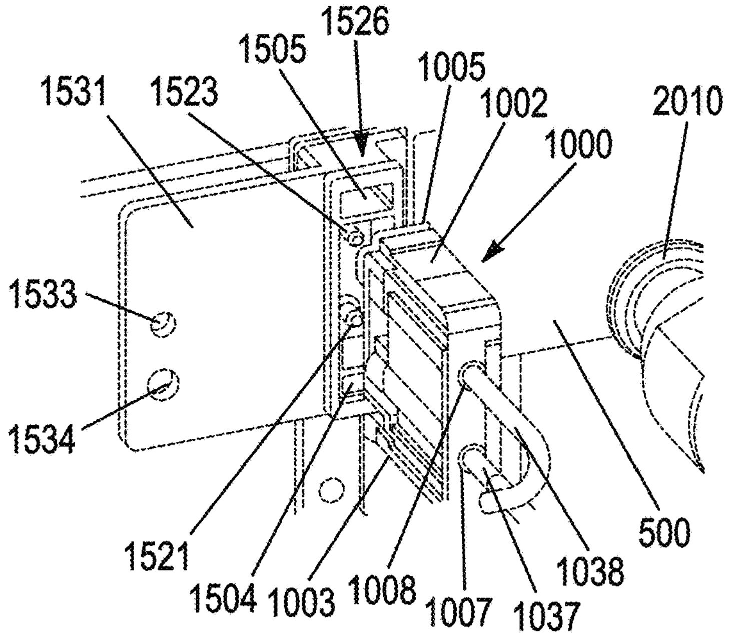
FIG. 7C shows a perspective view of a fluidic connector prior to being engaged with a receptacle of a flow cell.
Figure 7D:
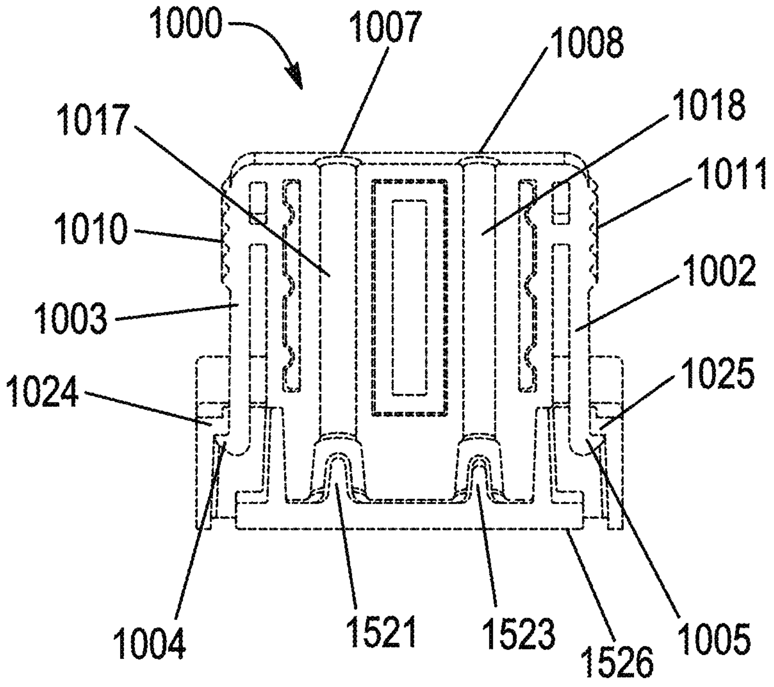
FIG. 7D shows a cross-section of a fluidic connector engaged with a receptacle of a flow cell.
Figure 7E:
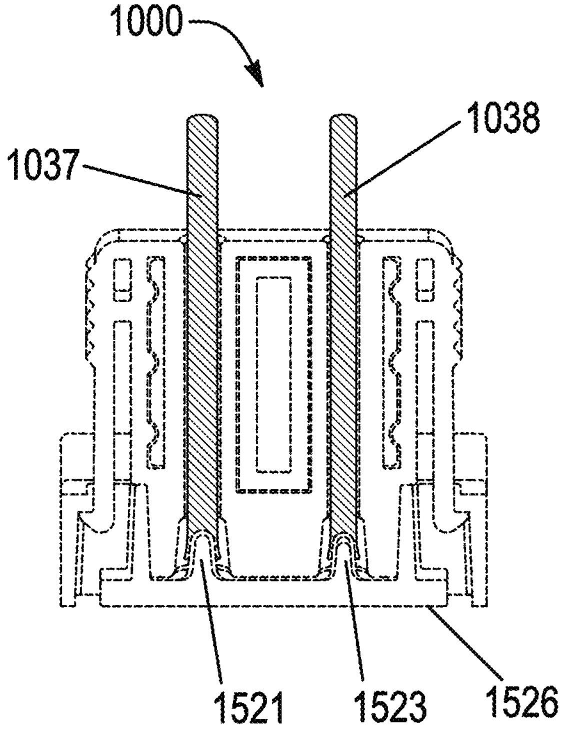
FIG. 7E shows a cross-section of a fluidic connector and tubes connected to ports of a flow cell.

FIGS. 7A-7E shows an adapter or fluidic connector 1000 that is configured to engage with receptacles on flow cells, such as receptacles 125, 126, 225, 226, 325, 326, 525, 526 and 1526. The engagement can be made conveniently by hand by inserting end 1006 into the receptacle while squeezing lever arms 1002 and 1003. The hooks 1005 and 1004 at the end of the lever arms will engage with complementary surfaces 1025 and 1024 in latches 1504 and 1505 as shown in FIG. 7D. Fluid line 1037 is inserted into hole 1007 of fluidic connector 1000 and passes through channel 1017 such that fluid line 1037 engages with port 1521 in receptacle 1526 of the flow cell (see FIG. 7E). Similarly, fluid line 1038 is inserted into hole 1008 of fluidic connector 1000 and passes through channel 1018 such that fluid line 1038 engages with port 1523 in receptacle 1526 of the flow cell (see FIG. 7E). The other end of fluid lines 1037 and 1038 engage with the fluidics system such that reagents and other fluids can be delivered to the channels of the flow cell. Fluidic connector 1000 can be conveniently removed from the receptacle 1526 by squeezing lever arms 1002 and 1003 to disengage hooks 1005 and 1004 while pulling fluidic connector 1000 from latches 1505 and 1504. Ridged surfaces 1010 and 1011 provide friction to the fingers, or to an appropriate tool, when pulling the fluidic connector 1000 from the receptacle. The wing 1531 of the flow cell shown in FIG. 7C has two holes 1533 and 1534 which are configured to engage two posts on a sliding rack. The use of two holes prevents a user from placing the flow cell on the detector in the wrong orientation.

Figure 8A:
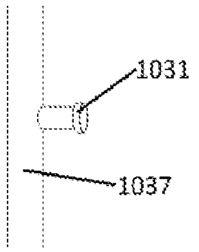
FIG. 8A shows an adhesive rivet attached to a tube.
Figure 8B:
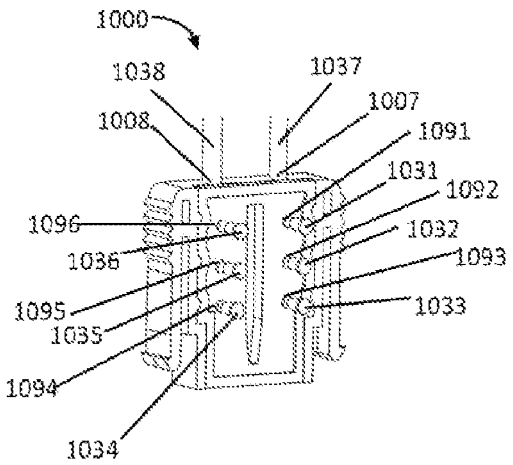
FIG. 8B shows an exploded view of a fluidic connector, tubes and adhesive rivets.
Figure 8C:
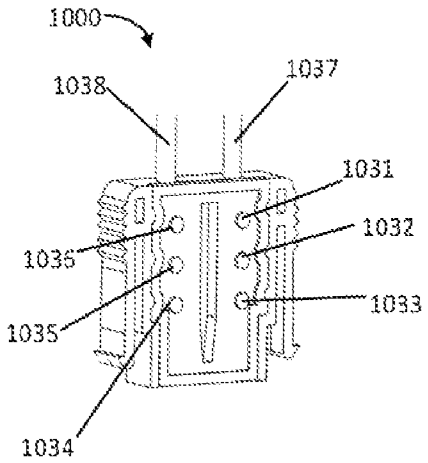
FIG. 8C shows a perspective view of an assembled fluidic connector.

FIG. 8 shows an application of adhesive rivets for assembling a fluidic connector. An adhesive rivet 1031 is adhered to flexible tube 1037 as shown in FIG. 8A. FIG. 8B shows an exploded view of six adhesive rivets 1031-1036 (i.e., 1031, 1032, 1033, 1034, 1035, and 1036) in relation to fluidic connector 1000. The rivets pass through holes 1091-1096 (i.e., 1091, 1092, 1093, 1094, 1095, and 1096), respectively such that the head of each rivet engages a counter 5 sunk seat in the hole and the tail of each rivet is adhered to tube 1037 or tube 1038. FIG. 8C shows an assembled view offluidic connector 1000.

Figure 14A:
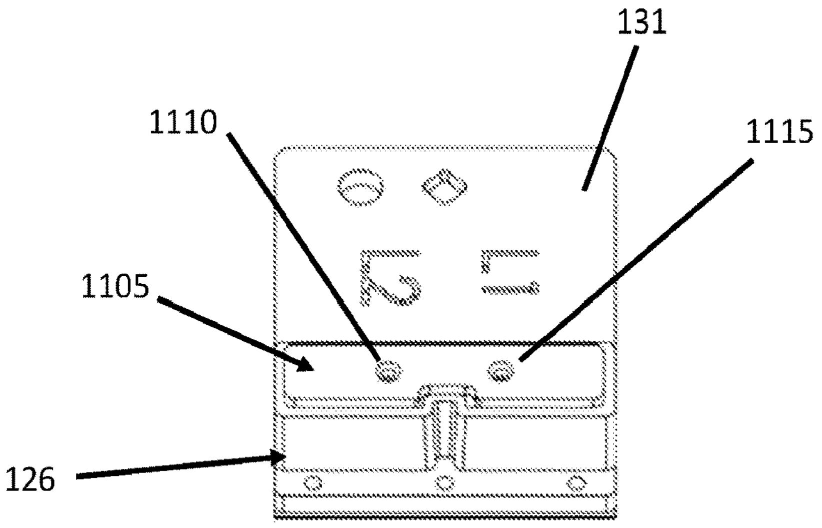
FIGS. 14A and 14B show perspective views of a pipette adapter that is configured to facilitate introduction of a nucleic acid library starting materials into a flow cell.
Figure 14B:
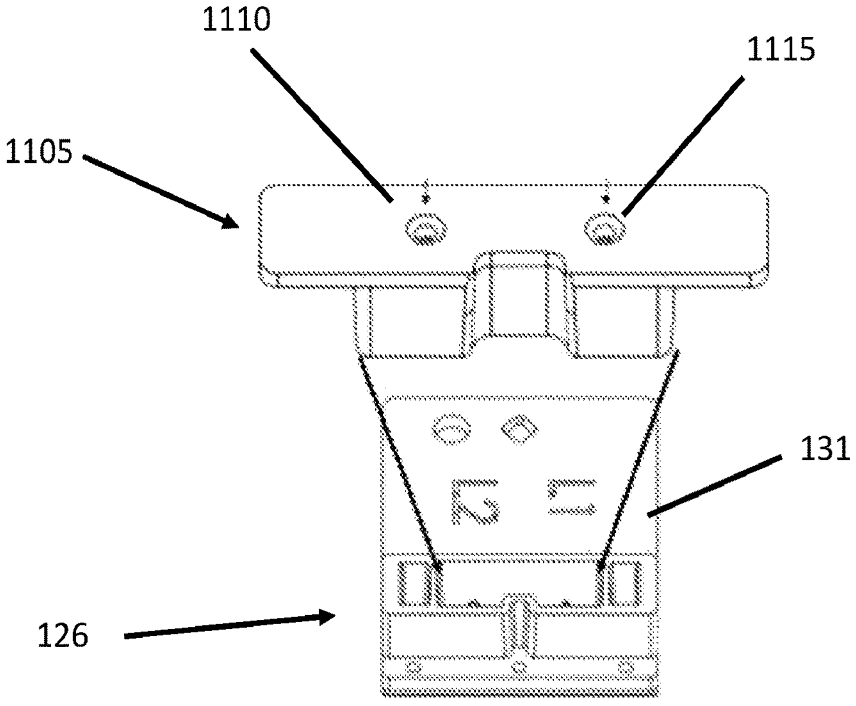

FIGS. 14A-14B shows a pipette adapter 1105 that is configured to engage with the receptacles on flow cells, such as the receptacles 125, 126, 225, 226, 325, 326, 525, and 526. The engagement can be made conveniently by hand. FIG. 14A shows the pipette adapter 1105 positioned within the receptacle 126 while FIG. 14B shows an exploded view of the receptacle adapter 1105 positioned above the receptacle 126. The pipette adapter 1105 is sized and shaped to fit within a basin of the receptacle 126. In this regard, the pipette adapter 1105 can have a shape that complements the shape of the basin so that the pipette adapter 1105 fits therein in a snug manner.

The pipette adapter 1105 includes a pipette fluid inlet 1110 and a fluid outlet 1115. The pipette fluid inlet 1110 aligns with the port 121 (FIG. 1A) of the receptacle 126 and the fluid outlet 1115 aligns with the port 123 of the receptacle 126 when the pipette adapter 1105 is seated within the receptacle 126. The pipette adapter 1105 is placed over the ports 121 and 123 to facilitate injection of libraries into the flow cell. This step can be performed by a user by hand. The pipette fluid inlet 1110 is sized and shaped to receive a pipette therein. As mentioned, the pipette adapter 1105 is configured to fit within any of the receptacles 125, 126, 225, 226, 325, 326, 525, and 526.

Figure 15A:
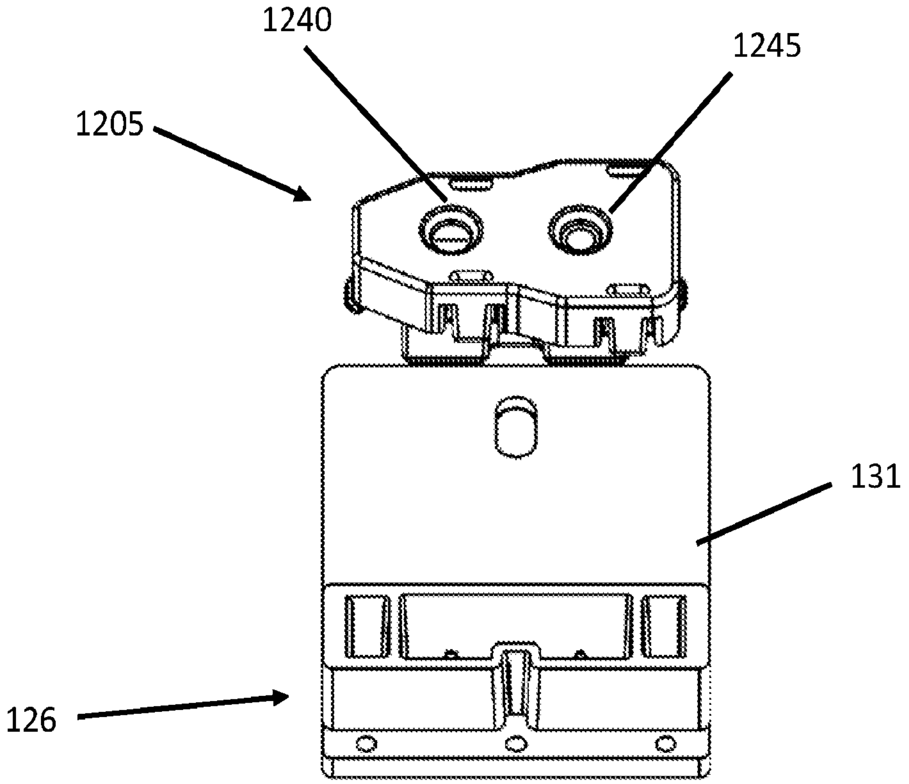
FIGS. 15A and 15B show another embodiment of a pipette adapter.
Figure 15B:
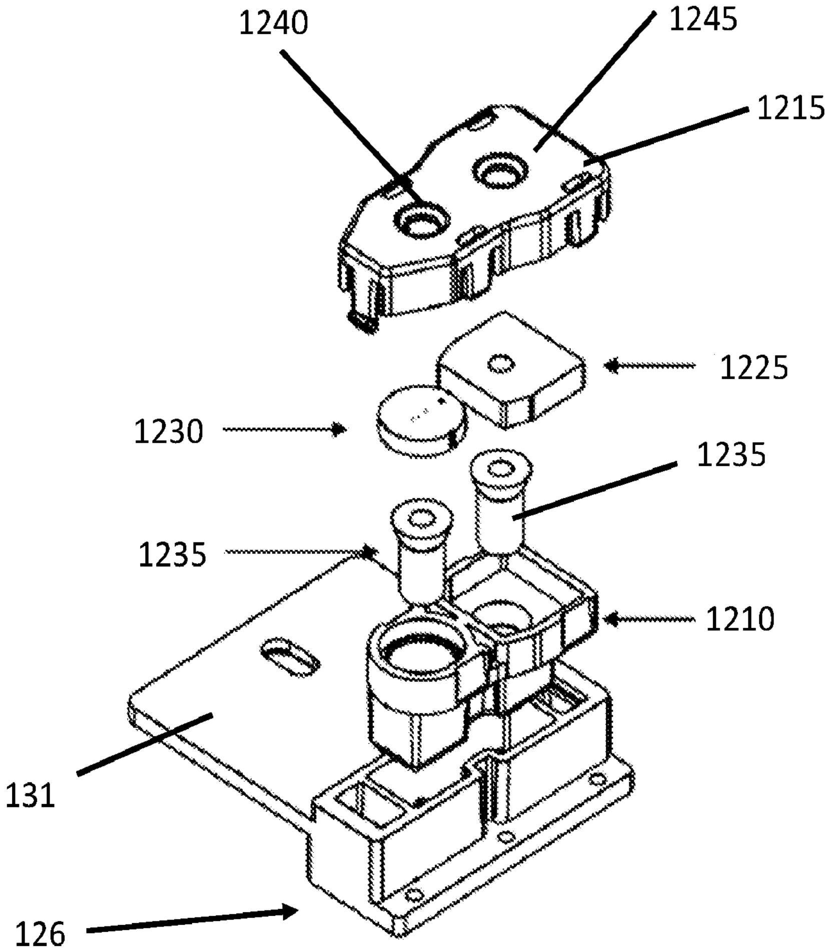

FIGS. 15A and 15B show another embodiment of a pipette adapter 1205 wherein the pipette adapter 1205 is made of multiple pieces. The pipette adapter 1105 of FIGS. 14A and 14B can optionally be a unitary, monolithic structure. The pipette adapter 1205 is configured to engage with the receptacles on flow cells, such as the receptacles 125, 126, 225, 226, 325, 326, 525, and 526. The engagement can be made conveniently by hand. FIG. 15A shows the pipette adapter 1105 positioned above the receptacle 126. As in the previous embodiment, the pipette adapter 1205 is sized and shaped to fit within a basin of the receptacle 126. The pipette adapter 1105 can have a shape that complements the shape of the basin so that the pipette adapter 1105 fits therein in a snug manner.

FIG. 15B shows an exploded view of the pipette adapter 1105, which includes a lower substrate 1210 that mechanically couples to an upper retainer 1215. The upper retainer 1215 can mate with the lower substrate 1210 such as by fitting over the lower substrate. When mated, the retainer 1215 and substrate 1210 define a space therebetween in which are positioned a wick 1225, a septum 1230, and at least one overmold 1235. The retainer 1215 defines a pipette fluid inlet 1240 and a fluid outlet 1245 that align with respective overmolds 1235, as described more fully below. The pipette fluid inlet 1240 aligns with the port 121 (FIG. 1A) of the receptacle 126 and the fluid outlet 1245 aligns with the port 123 of the receptacle 126 when the pipette adapter 1205 is seated within the receptacle 126.

When the retainer 1215 is coupled to the substrate 1210, the retainer exerts a force on the septum 1230 and wick 1225 to maintain a seal. The retainer also may have a snap fit with the wing 131. The septum 1230 acts as a seal for a pipette inserted into the pipette fluid inlet 1240 so as to inhibit or prevent the leaking of reagent. The wick 1225 is configured to soak or otherwise capture a reagent dispensed by a user.

The overmolds 1235 also form a seal with any tubing positioned therein. A first overmold co-axially aligns with the pipette fluid inlet 1240 and a second overmold co-axially aligns with the fluid outlet 1245. The overmolds can facilitate proper alignment of a pipette insertion into the pipette fluid inlet 1240 and can also securely maintain or fix positioning of the pipette therein. The overmolds 1235 are tubular in shape each with an internal lumen sized and shaped to receive a tube or other structure such as a pipette.

Figure 16:
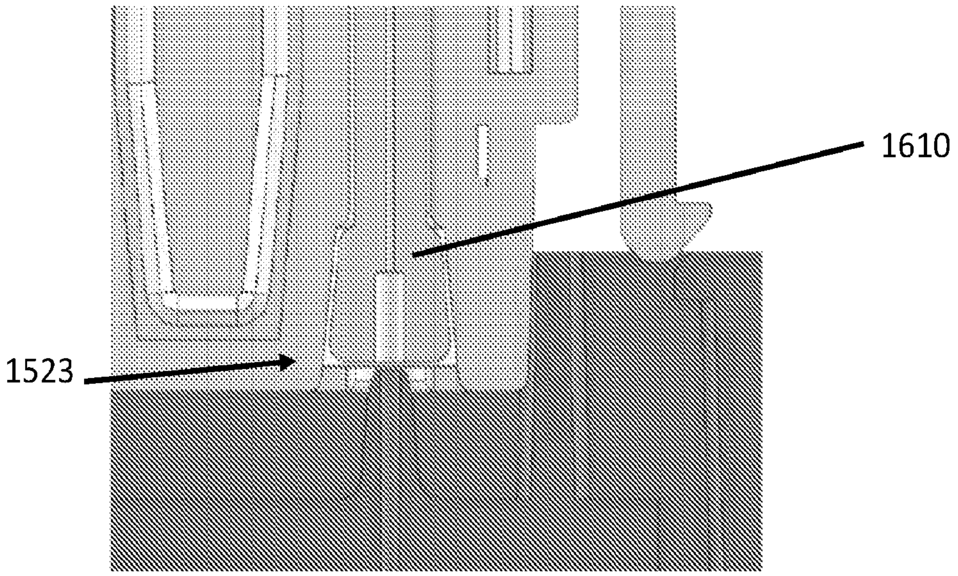
FIG. 16 shows a bottom region of fluidic connector with a tubing overmold.

One or more overmolds can also be used in combination with the adapter or fluidic connector 1000 that was previously described with reference to FIGS. 7A-7E. FIG. 16 shows a lower region of the fluidic connector 1000 in the region of port 1523. A tubing overmold 1610 is positioned inside the port 1523. The tubing overmold 1610 is configured for downstream 25 chemical manipulation of a flow cell to which libraries have been introduced. Such chemical manipulation is automated and requires that the tubing be held firmly in place while the flow cell is translated along an image capture surface. The overmold 1610 has a lower, enlarged locking region that secures the overmold 1610 and tubing in place while the flow cell is translated along an image capture surface. The tubing overmold 1610 is configured to hold the tubing in place as the flow cell is mechanically translated back and forth across the image capture device during various cycles of sequencing. The overmold 1610 can also be used in conjunction with high pressure fluid flow through the tubing. The overmold 1610 inhibits or prevents leaking of fluid from the tubing and also inhibits or prevents disconnection of an interface between the tubing and the flow cell. In a non-limiting example, the high pressure fluid flow is in the range of 40 psi to 80 psi.

A flow cell of the present disclosure can be used to sequence nucleic acids. Particularly useful sequencing processes are cyclical processes that employ repeated cycles of reagent delivery and flow cell detection. Each cycle can include one step or multiple steps. For example, each cycle can include all steps needed to detect a single nucleotide position in a template nucleic acid. Some sequencing processes employ cyclical reversible terminator (CRT) chemistry in which each cycle includes steps for (i) adding a single reversibly terminated nucleotide to increment a nascent primer to a nucleotide position that is to be detected; (ii) detecting the nucleotide at the single nucleotide position, and (iii) deblocking the nascent primer to allow a return to step (i) to start a subsequent cycle.

A specific example of a useful CRT nucleic acid sequencing process is a Sequencing By Binding™ (SBB™) reaction, for example, as described in commonly owned US Pat. App. Pub. Nos. 2017/0022553 A1; 2018/0044727 A1; 2018/0187245 A1; or 2018/0208983 A1, each of which is incorporated herein by reference. Generally, SBB™ methods for determining the sequence of a template nucleic acid molecule can be based on formation of a stabilized ternary complex (between polymerase, primed nucleic acid and cognate nucleotide) under specified conditions. The method can include an examination phase followed by a nucleotide incorporation phase.

The examination phase of an SBB™ process can be carried out in a flow cell, the flow cell containing at least one template nucleic acid molecule primed with a primer by delivering to the flow cell reagents to form a first reaction mixture. The reaction mixture can include the primed template nucleic acid, a polymerase and at least one nucleotide type. Interaction of polymerase and a nucleotide with the primed template nucleic acid molecule(s) can be observed under conditions where the nucleotide is not covalently added to the primer(s); and the next base in each template nucleic acid can be identified using the observed interaction of the polymerase and nucleotide with the primed template nucleic acid molecule(s). The interaction between the primed template, polymerase and nucleotide can be detected in a variety of schemes. For example, the nucleotides can contain a detectable label. Each nucleotide can have a distinguishable label with respect to other nucleotides. Alternatively, some or all of the different nucleotide types can have the same label and the nucleotide types can be distinguished based on separate deliveries of different nucleotide types to the flow cell. In some embodiments, the polymerase can be labeled. Polymerases that are associated with different nucleotide types can have unique labels that distinguish the type of nucleotide to which they are associated. Alternatively, polymerases can have similar labels and the different nucleotide types can be distinguished based on separate deliveries of different nucleotide types to the flow cell. Detection can be carried out by scanning the flow cell using an apparatus or method set forth herein or in reference cited herein.

During the examination phase of an SBB™ process, discrimination between correct and incorrect nucleotides can be facilitated by ternary complex stabilization. A variety of conditions and reagents can be useful. For example, the primer can contain a reversible blocking moiety that prevents covalent attachment of nucleotide; and/or cofactors that are required for extension, such as divalent metal ions, can be absent; and/or inhibitory divalent cations that inhibit polymerase-based primer extension can be present; and/or the polymerase that is present in the examination phase can have a chemical modification and/or mutation that inhibits primer extension; and/or the nucleotides can have chemical modifications that inhibit incorporation, such as 5' modifications that remove or alter the native triphosphate moiety. The examination phase can include scanning of the flow cell using apparatus and methods set forth herein.

The extension phase can then be carried out by creating conditions in the flow cell where a nucleotide can be added to the primer on each template nucleic acid molecule. In some embodiments, this involves removal of reagents used in the examination phase and replacing them with reagents that facilitate extension. For example, examination reagents can be replaced with a polymerase and nucleotide(s) that are capable of extension. Alternatively, one or more reagents can be added to the examination phase reaction to create extension conditions. For example, catalytic divalent cations can be added to an examination mixture that was deficient in the cations, and/or polymerase inhibitors can be removed or disabled, and/or extension competent nucleotides can be added, and/or a deblocking reagent can be added to render primer(s) extension competent, and/or extension competent polymerase can be added.

Another useful CRT sequencing process is sequencing-by-synthesis (SBS). SBS generally involves the enzymatic extension of a nascent primer through the iterative addition of nucleotides against a template strand to which the primer is hybridized. Briefly, SBS can be initiated by contacting target nucleic acids, for example, attached to sites in a flow cell, with one or more labeled nucleotides, DNA polymerase, etc. Those sites where a primer is extended using the target nucleic acid as template will incorporate a labeled nucleotide that can be detected. Detection can include scanning using an apparatus or method set forth herein. Optionally, the labeled nucleotides can further include a reversible terminator that prevents further primer extension once a nucleotide has been added to a primer. For example, a nucleotide analog having a reversible terminator moiety can be added to a primer such that subsequent extension cannot occur until a deblocking agent is delivered to remove the moiety. Thus, for embodiments that use reversible termination, a deblocking reagent can be delivered to the vessel (before or after detection occurs). Washes can be carried out between the various delivery steps. The cycle can be performed n times to extend the primer by n nucleotides, thereby detecting a sequence of length n. Exemplary SBS procedures, reagents and detection components that can be readily adapted for use with a method, system or apparatus of the present disclosure are described, for example, in Bentley et al., *Nature* 456:53-59 (2008), WO 04/018497; WO 91/06678; WO 07/123744; U.S. Pat. Nos. 7,057,026; 7,329,492; 7,211,414; 7,315,019 or 7,405,281, and US Pat. App. Pub. No. 2008/0108082 A1, each of which is incorporated herein by reference. Also useful are SBS methods that are commercially available from Illumina, Inc. (San Diego, CA).

Some SBS embodiments are cyclical but need not employ reversible terminator nucleotides. A particularly useful method includes detection of a proton released upon incorporation of a nucleotide into an extension product. For example, sequencing based on detection of released protons can use reagents and an electrical detector that are commercially available from Thermo Fisher (Waltham, MA) or described in US Pat. App. Pub. Nos. 2009/0026082 A1; 2009/0127589 A1; 2010/0137143 A1; or 2010/0282617 A1, each of which is incorporated herein by reference.

Other cyclical sequencing processes can be used, such as pyrosequencing. Pyrosequencing detects the release of inorganic pyrophosphate (PPi) as nucleotides are incorporated into a nascent primer hybridized to a template nucleic acid strand (Ronaghi, et al., *Analytical Biochemistry* 242 (1), 84-9 (1996); Ronaghi, *Genome Res.* 11 (1), 3-11 (2001); Ronaghi et al. *Science* 281 (5375), 363 (1998); U.S. Pat. Nos. 6,210,891; 6,258,568 and 6,274,320, each of which is incorporated herein by reference). In pyrosequencing, released PPi can be detected by being converted to adenosine triphosphate (ATP) by ATP sulfurylase, and the resulting ATP can be detected via luciferase-produced photons.

Sequencing-by-ligation reactions are also useful including, for example, those described in Shendure et al. *Science* 309:1728-1732 (2005); U.S. Pat. No. 5,599,675; or U.S. Pat. No. 5,750,341, each of which is incorporated herein by reference. Some embodiments can include sequencing-by-hybridization procedures as described, for example, in Bains et al., *Journal of Theoretical Biology* 135 (3), 303-7 (1988); Drmanac et al., *Nature Biotechnology* 16, 54-58 (1998); Fodor et al., *Science* 251 (4995), 767-773 (1995); or WO 1989/10977, each of which is incorporated herein by reference. In both sequencing-by-ligation and sequencing-by-hybridization procedures, primers that are hybridized to nucleic acid templates are subjected to repeated cycles of extension by oligonucleotide ligation. Typically, the oligonucleotides are luminescently labeled and can be detected to determine the sequence of the template, for example, using a system or method set forth herein.

Steps for the above sequencing methods can be carried out cyclically. For example, examination and extension steps of an SBB™ method can be repeated such that in each cycle a single next correct nucleotide is examined (i.e. the next correct nucleotide being a nucleotide that correctly binds to the nucleotide in a template nucleic acid that is located immediately 5' of the base in the template that is hybridized to the 3'-end of the hybridized primer) and, subsequently, a single next correct nucleotide is added to the primer. Any number of cycles of a sequencing method set forth herein can be carried out including, for example, at least 1, 2, 10, 100, 250, 500 or more cycles. Alternatively or additionally, no more than 500, 250, 100, 10, 2 or 1 cycles are carried out.

Some embodiments can utilize methods involving real-time monitoring of DNA polymerase activity. For example, nucleotide incorporations can be detected through fluorescence resonance energy transfer (FRET) interactions between a fluorophore-bearing polymerase and gamma-phosphate-labeled nucleotides, or with zero-mode waveguides (ZMW). Techniques and reagents for sequencing via FRET and or ZMW detection that can be modified for use in an apparatus or method set forth herein are described, for example, in Levene et al. *Science* 299, 682-686 (2003); Lundquist et al. *Opt. Lett.* 33, 1026-1028 (2008); Korlach et al. *Proc. Natl. Acad. Sci. USA* 105, 1176-1181 (2008); or U.S. Pat. Nos. 7,315,019; 8,252,911 or 8,530,164, the disclosures of which are incorporated herein by reference.

Any of a variety of nucleic acid amplification techniques can be used to copy nucleic acids in a flow cell. Exemplary techniques that can be used include, but are not limited to, polymerase chain reaction (PCR), rolling circle amplification (RCA), multiple displacement amplification (MDA), bridge amplification, random prime amplification (RPA) or others known in the art of molecular biology. In particular configurations, one or more primers used for amplification can be attached to a surface in a flow cell. In such embodiments, extension of the surface-attached primer(s) along template nucleic acids will result in copies of the templates being attached to the surface. Such amplification methods can be used for analytical purposes such as real time PCR or quantitative PCR. Alternatively, amplification can be used to prepare nucleic acids for downstream applications such as nucleic acid sequencing. Preparative amplification methods that result in one or more sites on a solid support, where each site is attached to multiple copies of a particular nucleic acid template, are referred to as "clustering" methods.

In PCR techniques, one or both primers used for amplification can be attached to a surface. Formats that utilize two species of attached primer are often referred to as bridge amplification because double stranded amplicons form a bridge-like structure between the two attached primers that flank the template sequence that has been copied. Exemplary reagents and conditions that can be used for bridge amplification are described, for example, in U.S. Pat. Nos. 5,641,658 or 7,115,400; U.S. Patent Pub. Nos. 2002/0055100 A1, 2004/0096853 A1, 2004/0002090 A1, 2007/0128624 A1 or 2008/0009420 A1, each of which is incorporated herein by reference. PCR amplification can also be carried out with one of the amplification primers attached to the surface and the second primer in solution. An exemplary format that uses a combination of one solid phase-attached primer and a solution phase primer is known as primer walking and can be carried out as described in U.S. Pat. No. 9,476,080, which is incorporated herein by reference. Another example is emulsion PCR which can be carried out as described, for example, in Dressman et al., *Proc. Natl. Acad. Sci. USA* 100:8817-8822 (2003), WO 05/010145, or U.S. Patent Pub. Nos. 2005/0130173 A1 or 2005/0064460 A1, each of which is incorporated herein by reference.

RCA techniques can be used in a method set forth herein. Exemplary reagents that can be used in an RCA reaction and principles by which RCA produces amplicons are described, for example, in Lizardi et al., *Nat. Genet.* 19:225-232 (1998) or US Pat. App. Pub. No. 2007/0099208 A1, each of which is incorporated herein by reference. Primers used for RCA can be in solution or attached to a surface in a flow cell.

MDA techniques can also be used in a method of the present disclosure. Some reagents and useful conditions for MDA are described, for example, in Dean et al., *Proc Natl. Acad. Sci. USA* 99:5261-66 (2002); Lage et al., *Genome Research* 13:294-307 (2003); Walker et al., *Molecular Methods for Virus Detection,* Academic Press, Inc., 1995; Walker et al., *Nucl. Acids Res.* 20:1691-96 (1992); or U.S. Pat. Nos. 5,455,166; 5,130,238; or 6,214,587, each of which is incorporated herein by reference. Primers used for MDA can be in solution or attached to a surface in a flow cell.

Nucleic acid templates that are used in a method or composition herein can be DNA such as genomic DNA, synthetic DNA, amplified DNA, complementary DNA (cDNA) or the like. RNA can also be used such as mRNA, ribosomal RNA, tRNA or the like. Nucleic acid analogs can also be used as templates herein. Primers used herein can be DNA, RNA or analogs thereof.

Figure 9A:
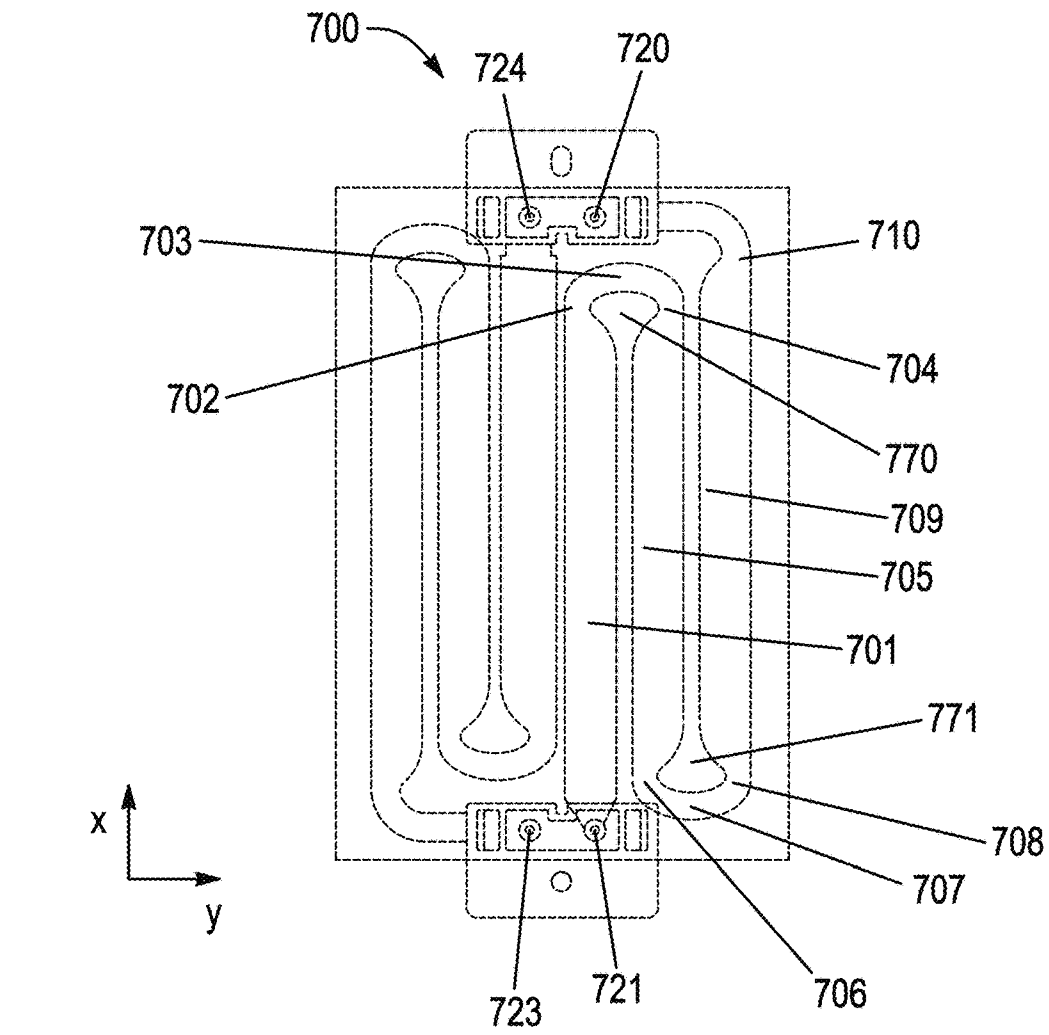
FIG. 9A shows a top view of assembled flow cell 700.
Figure 9B:
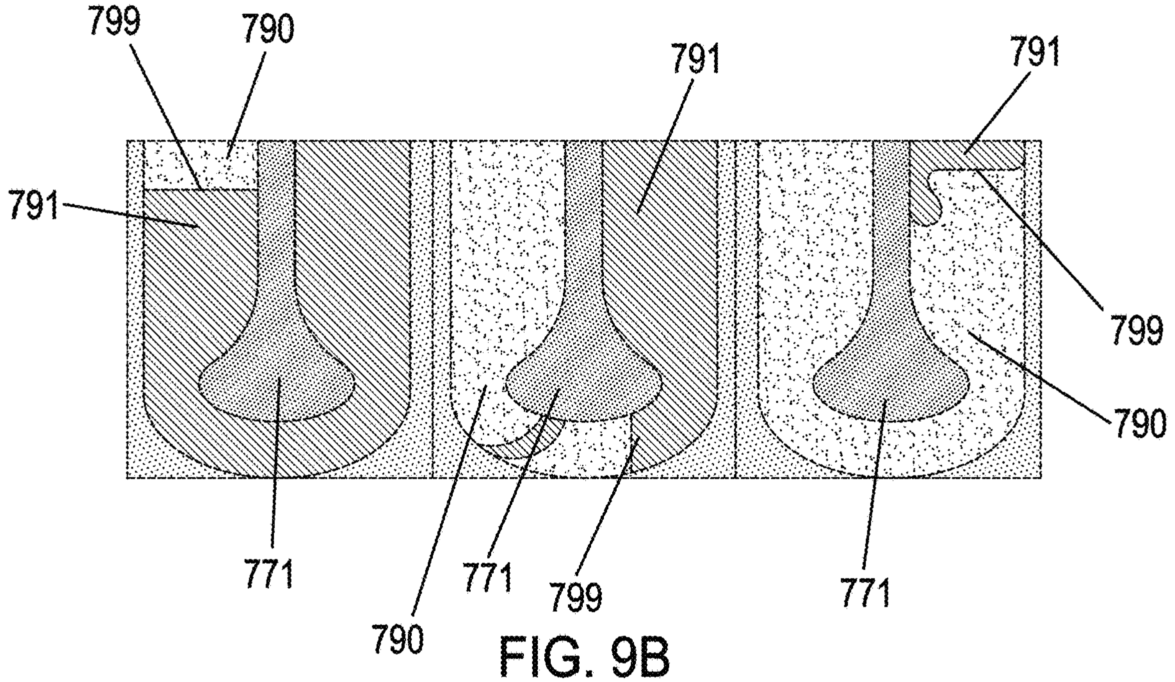
FIG. 9B shows photographs of a liquid being displaced by a foam in an assembled flow cell.

A channel of a flow cell can run straight from ingress to egress as exemplified in FIGS. 1-4. In some configurations, a channel can be configured to lack any bends or curves in the bulk flow of a fluid therein. Alternatively, a channel can have a curve or bend. For example, a channel can wind across the surface of a flow cell as exemplified by flow cell 700 in FIG. 9A. Here, each channel includes three regions for detection of analytes. More specifically, the channel that connects port 721 to port 720 includes detection regions 701, 705 and 709. The detection regions are relatively wide compared to other regions in the channel in order to accommodate a relatively large surface area for presentation of an array. Fluids flow from ingress port 721 directly into relatively wide detection region 701, then through a curved region 703 that narrows at 702 and remains narrowed around a 180° tum ending at 704 where the channel widens to detection region 705. After passing through widened detection region 705, the fluid passes through a curved region 707 that narrows at 706 and remains narrowed around a 180° tum ending at 708 where the channel widens to detection region 709. After passing through widened detection region 709, the fluid passes through a narrowed 90° tum that starts at 710 and directs the fluid to egress 720. The 180° curved sections have a shape that functions to maintain a relatively flat front between two fluids during an exchange of one fluid for the other. The flat front is achieved by configuring the inner wall of the curve to have the same or very similar length to the outer wall of the curve. This configuration yields a mushroom shaped region 770 (FIG. 9A) or 771 (FIG. 9B) of the gasket on the inside of the turn. The channel that connects port 723 to port 724 has similar shape and characteristics to those of the channel that connects port 720 to port 721. As shown in FIG. 9B, a foam 791 that is exchanged with a liquid 790 will maintain a flat front 799 as it traverses the curve and on both sides of the curve, thus demonstrating that the shape of the channel achieves efficient and spatially uniform fluid exchange.

Figure 10:
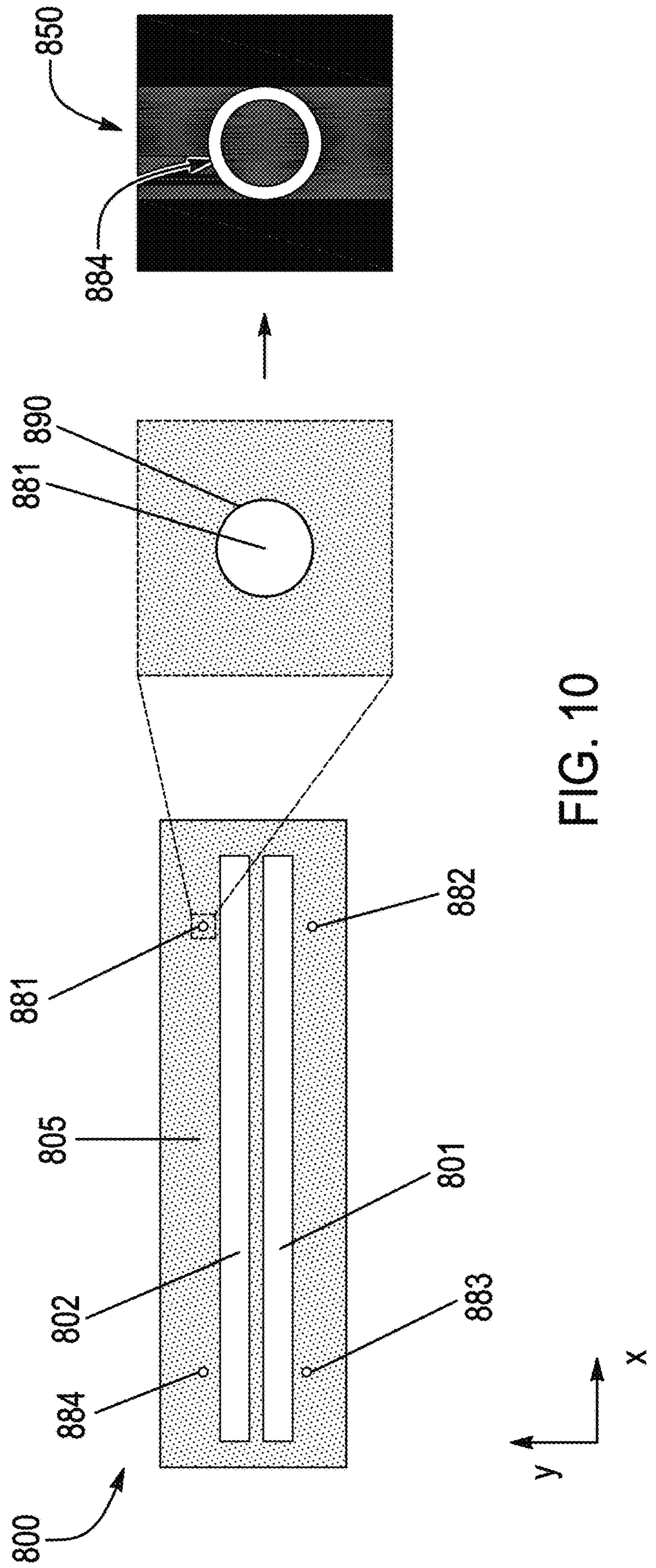
FIG. 10 shows a top view of a flow cell having a luminescent marker.

A flow cell of the present disclosure can include one or more fiducials that are useful for 2-dimensional registration of the flow cell in the x and y dimensions. As shown in FIG. 10 a fiducial 881, 882, 883, 884 can be present in a gasket 805 that is interposed between two transparent substrates. Gasket 805 also functions to delineate channels 801 and 802 in a flow cell 800. An efficient method for producing fiducial 881 is to cut a hole into pressure sensitive adhesive (e.g.

white polyester ARcare® 8939 from Adhesives Research, Glen Rock PA) using an IR or UV laser. The resulting hole has a luminescent edge 890 which produces an apparent ring shape 850 when observed using a luminometer. Without wishing to be held to mechanism, it is believed that the luminescence results from a product of the interaction of the laser light with the adhesive in the PSA.

An advantage of incorporating a fiducial 881 into the gasket material is that using routine manufacturing processes can be used to accurately position the gasket with respect to the channels and to accurately place the fiducial in the gasket, resulting in a high confidence spatial relationship between the fiducial and an array present in the channel. Although the fiducial in FIG. 10 has a round shape, any of a variety of shapes can be formed including, for example, shapes having symmetry relationships that favor certain registration algorithms (e.g. square, triangle, regular convex polygon, concentric circles, concentric polygons etc.). Asymmetric or irregularly shaped fiducials can also be useful.

Various other fiducials and techniques for producing the fiducials are demonstrated by FIG. 11. FIG. 11A shows a cross-section of a flow cell having a substrate 53 that is attached to a lid 51 by a PSA layer 52; a hole 62 in lid 51 that extends through the PSA layer 52, wherein hole 62 is filled with a liquid adhesive 54 that is doped with a luminophore. When viewed from above lid 51, the fiducial will produce a filled shape that is defined by the shape of hole 62. For example, a cylindrical hole will produce a circular-shaped fiducial. A fiducial can have a cross-sectional shape that is similar to these set forth herein in the context of vias for liquid adhesives.

Figure 11A:
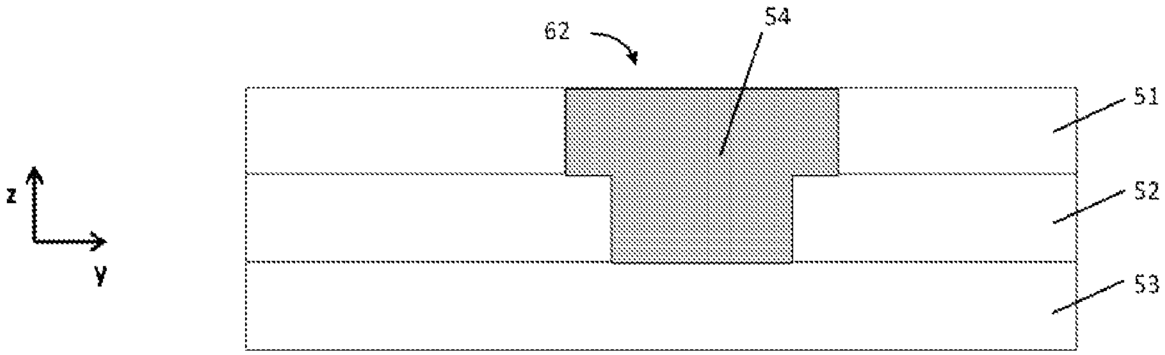
FIG. 11A shows a cross-section of a luminescent-doped medium in a flow cell.
Figure 11B:
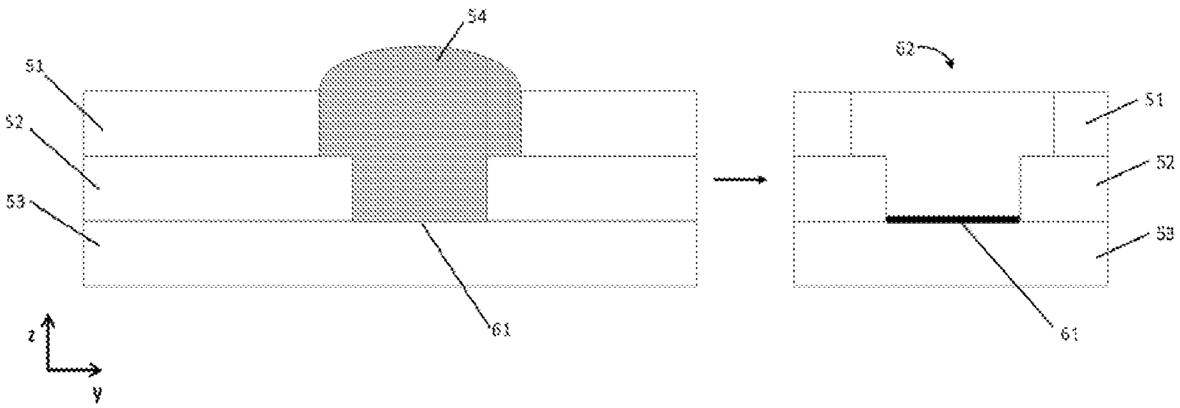
FIG. 11B shows a cross-section of a flow cell stained on one layer by a luminescent doped medium.
Figure 11C:
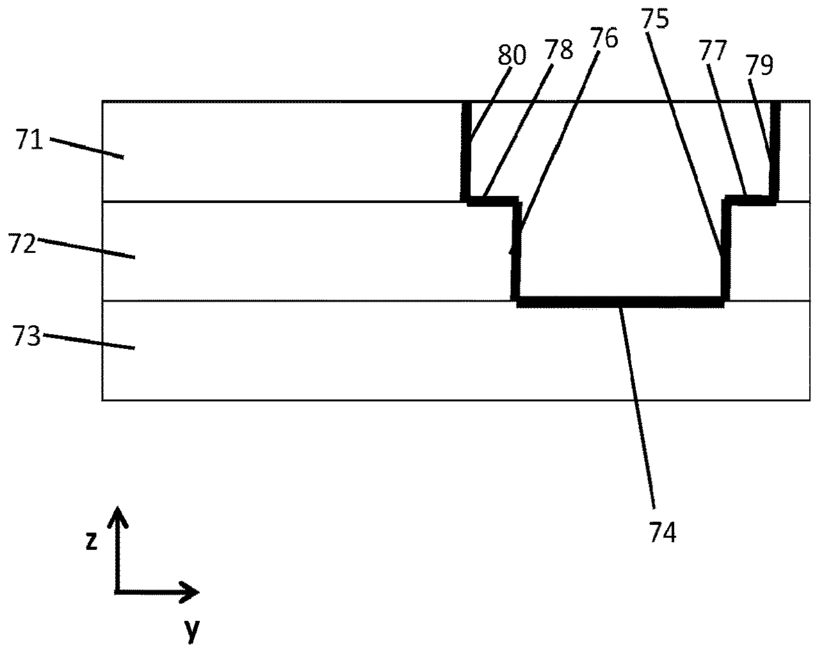
FIG. 11C shows a cross-section of a flow cell stained on multiple layers by a luminescent doped medium.

FIG. 11B shows a process for staining a flow cell to produce a fiducial. The flow cell is presented in cross-section, showing a substrate 53 that is attached to a lid 51 by a PSA layer 52. Lid 51 has a hole 62 that extends through the PSA layer 52 to a surface 61 in substrate 53. Hole 62 is filled with a liquid 54 that is doped with a luminophore and the liquid is removed leaving a luminescent stain on surface 61. In this configuration, surface 61 is amenable to staining by the luminophore, whereas the surfaces of the lid and PSA do not take up luminophore. A configuration, that uses a lid 71, PSA layer 72, and substrate 73 that are capable of taking up the luminophore is shown in FIG. 11C. The surface of lid 71 that contacts the luminophore will be stained (see surfaces 79 and 80 in the cross-section view). Similarly, the surfaces of the PSA layer 72 that contact the luminophore will be stained (see surfaces 75, 76, 77 and 78 in the cross-section view). Surface 74 will also be stained. When viewed from above the lid, the fiducials in FIGS. 11B and 11C will produce a filled shape that is defined by the shape of hole 62.

Figure 11D:
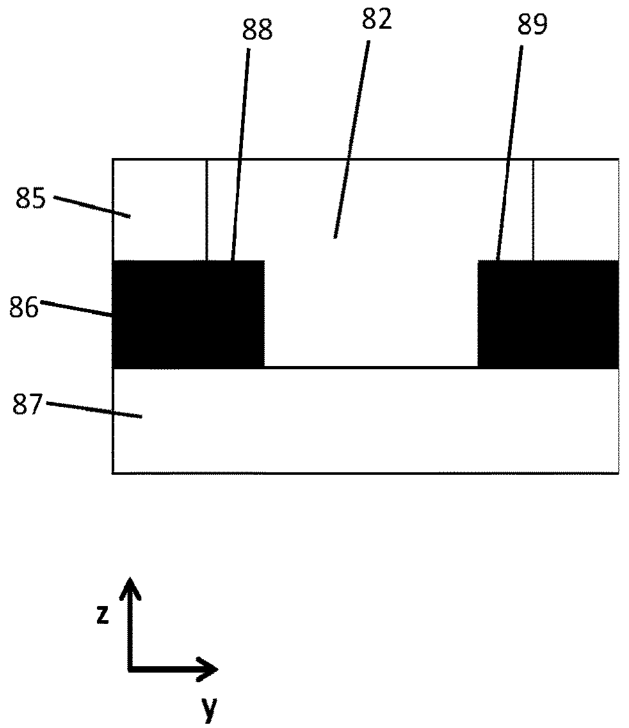
FIG. 11D shows a cross-section of a flow cell having a luminescent doped gasket.

FIG. 11D shows a cross-section of a flow cell having a substrate 87 that is attached to a lid 85 by a PSA layer 86, wherein the PSA layer contains a luminescent material. In this configuration, the lid 85 is not transparent to the excitation or emission of the luminescent material. Because the hole 82 in lid 85 is wider than the hole in the PSA layer 86 and because the holes in both layers are round, the fiducial will appear as a luminescent ring when viewed from above lid 85. Portions 88 and 89 of the luminescent ring are shown in the cross-section view of FIG. 11D.

Exemplary luminophores that can be used as a dopant for a fiducial or as a label for an analyte include, but are not limited to, fluorescent nanocrystals; quantum dots; green fluorescent protein and color shifted mutants thereof, phycobiliproteins such as phycocyanin and phycoerythrin, d-Rhodamine acceptor dyes including dichloro[R110], dichloro[R6G], dichloro[TAMRA], dichloro[ROX] or the like; fluorescein donor dye including fluorescein, 6-FAM, or the like; Cyanine dyes such as Cy3B; Alexa dyes, SETA dyes, Atto dyes such as atto 647N which forms a FRET pair with Cy3B and the like. Others include, but are not limited to, MDCC (7-diethylamino-3-[([(2-maleimidyl)ethyl] amino)carbonyl]coumarin), TET, HEX, Cy3, TMR, ROX, Texas Red, Cy5, LC red 705 and LC red 640. Other luminophores known in the art such as those described in *Principles of Fluorescence Spectroscopy,* Joseph R. Lakowicz (Editor), Plenum Pub Corp, 2nd edition (July 1999) and the 6th Edition of *Molecular Probes Handbook* by Richard P. Hoagland (each of which is incorporated herein by reference, can be useful. In particular embodiments, a luminophore that is used herein or a luminescent material can have a fluorescence quantum yield that is at least 0.2, 0.5, 0.8 or higher.

Figure 12A:
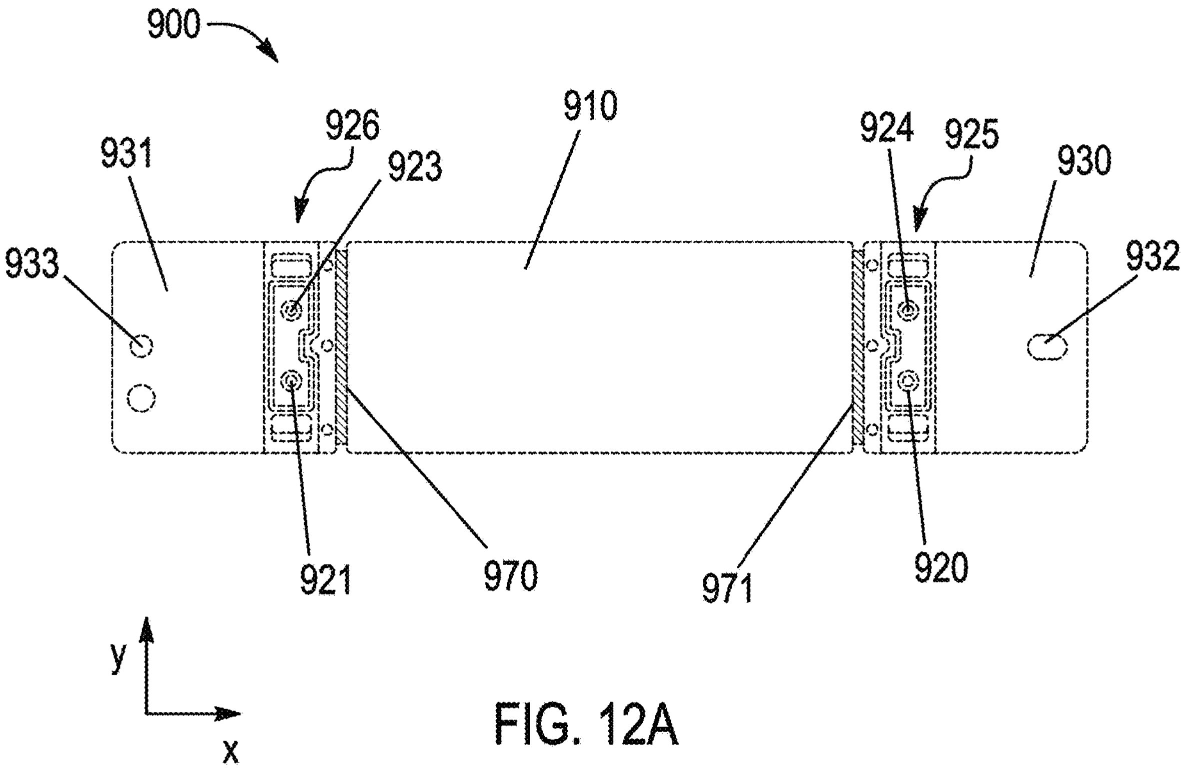
FIG. 12A shows a top view of a flow cell having a thermal expansion joint.
Figure 12B:
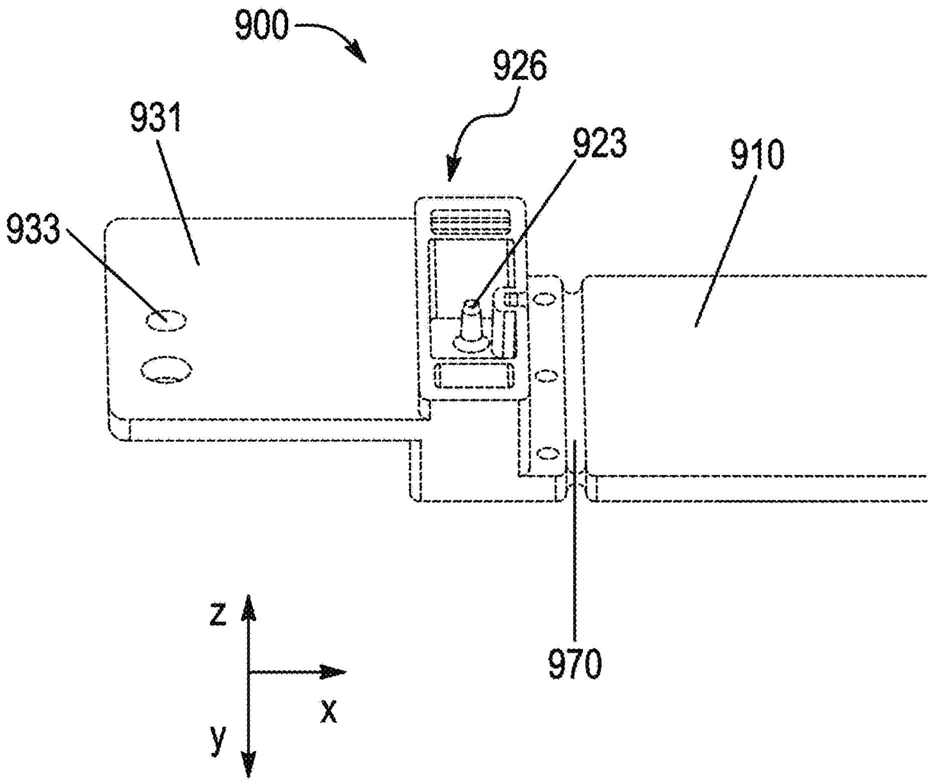
FIG. 12B shows a perspective view of a thermal expansion joint in a flow cell.

FIG. 12A shows a top view of a flow cell lid 900 that includes expansion joints 970 and 971 which connect wings 931 and 930, respectively, to window region 910. FIG. 12B shows a perspective view of the expansion joint 970. Expansion joints 970 and 971 are made from a low durometer material (i.e. a material having low hardness). The expansion joints accommodate movements that occur when a flow cell is subjected to temperature changes, for example, during a thermal cycling process. The expansion joints prevent cracking or warping that may occur when the lid is made from a material having a different coefficient of thermal expansion (CTE) compared to the CTE for another substrate or gaskets to which the lid is attached.

In an example embodiment, there is disclosed a flow cell comprising: (a) a gasket interposed between a first substrate and a second substrate, wherein the gasket, the first substrate and the second substrate are impermeable to aqueous liquid and liquid adhesive, wherein the gasket has a footprint on the first substrate that delineates a channel for containing the aqueous liquid; (b) a via in the gasket, the via containing a solidified liquid adhesive that bonds the first substrate to the second substrate, wherein the solidified liquid adhesive in the via is separated from the channel by the gasket; and (c) a first channel port connecting the channel to the exterior of the flow cell, wherein the first channel port is permeable to the aqueous liquid. In an example variation of any embodiment, there is disclosed the flow cell of any disclosed embodiment, further comprising a via port connecting the via to the exterior of the flow cell. In an example variation of any embodiment, there is disclosed the flow cell of any disclosed embodiment, further comprising a second via port connecting the via to the exterior of the flow cell. In an example variation of any embodiment, there is disclosed the flow cell of any disclosed embodiment, wherein the gasket comprises a plurality of vias, the vias each containing a solidified liquid adhesive that bonds the first substrate to the second substrate, wherein the solidified liquid adhesive in the vias is separated from the channel by the gasket. In an example variation of any embodiment, there is disclosed the flow cell of any disclosed embodiment, wherein the channel comprises an array of analytes. In an example variation of any embodiment, the array of analytes is attached to the first substrate in the channel. In an example variation of any embodiment, a second array of analytes is attached to the second substrate in the channel. In an example variation of any embodiment, the analytes comprise nucleic acids, different nucleic acids being attached to respective sites of the array. In an example variation of any embodiment, the array comprises at least 100 of the sites per $mm^2$. In an example variation of any embodiment, the gasket has a footprint on the second substrate that delineates a channel for containing the aqueous liquid. In an example variation of any embodiment, the footprint on the first substrate is the same shape as the footprint on the second substrate. In an example variation of any embodiment, the first substrate comprises a planar surface that forms a first side of the channel and the second substrate comprise a planar surface that forms a second side of the channel. In an example variation of any embodiment, there is disclosed a second channel port connecting the channel to the exterior of the flow cell, wherein the second channel port is permeable to the aqueous liquid. In an example variation of any embodiment, the aqueous liquid is present in the channel. In an example variation of any embodiment, the aqueous liquid exerts a positive pressure of at least 10 PSI on the channel. In an example variation of any embodiment, the gasket comprises pressure sensitive adhesive, the pressure sensitive adhesive being in contact with one or both of the first and second substrates. In an example variation of any embodiment, the first substrate and the second substrate comprise the same material. In an example variation of any embodiment, the material comprises glass or plastic. In an example variation of any embodiment, the glass comprises a silane or organosilane coating. In an example variation of any embodiment, the first substrate comprises a different material from the material of the second substrate. In an example variation of any embodiment, the first substrate comprises glass and the second substrate comprises plastic. In an example variation of any embodiment, the first substrate comprises a transparent material and a thermal expansion joint. In an example variation of any embodiment, the via contiguously encircles the channel. In an example variation of any embodiment, the via contiguously encircles individual channels of a plurality of channels in the flow cell. In an example variation of any embodiment, the gasket delineates the distance between the first and second substrate in the channel. In an example variation of any embodiment, the distance is greater than 0.1 mm and less than 1 cm. In an example variation of any embodiment, the volume of the channel is greater than 10 μl and less than 10 ml. In an example variation of any embodiment, one or both of the first and second substrates is transparent to UV, VIS or IR radiation. In an example variation of any embodiment, the solidified liquid adhesive comprises a luminescent material. In an example variation of any embodiment, the gasket comprises a luminescent material. In an example variation of any embodiment, the channel comprises a turn of at least ninety degrees, wherein the turn has an inner wall and an outer wall, the inner wall having substantially the same length as the outer wall.

In another example embodiment, there is disclosed a method of making a flow cell comprising (a) interposing a gasket between a first substrate and a second substrate to delineate a channel for containing an aqueous liquid, wherein the gasket, the first substrate and the second substrate are impermeable to aqueous liquid and liquid adhesive; (b) delivering a liquid adhesive to a via in the gasket; and (c) allowing the liquid adhesive to bond the first substrate to the second substrate, wherein the liquid adhesive is separated from the channel by the gasket. In an example variation of any embodiment, step (b) is performed prior to step (a). In an example variation of any embodiment, the liquid adhesive is delivered through a via ingress port in the first substrate, in the second substrate or in the gasket. In an example variation of any embodiment, the flow cell comprises a via egress port through which air is vented when the liquid adhesive is delivered through the via ingress port. In an example variation of any embodiment, step (c) comprises applying heat or light to allow the liquid adhesive to bond the first substrate to the second substrate and the gasket. In an example variation of any embodiment, there is further disclosed creating an array of analytes in the channel. In an example variation of any embodiment, the analytes comprise nucleic acids, different nucleic acids being attached to respective sites of the array. In an example variation of any embodiment, the array is created by attaching the analytes to the first substrate in the channel. In an example variation of any embodiment, there is disclosed adhering the gasket to the first substrate using a pressure sensitive adhesive. In an example variation of any embodiment, there is disclosed adhering the gasket to the second substrate using a pressure sensitive adhesive. In an example variation of any embodiment, the first substrate and the second substrate comprise the same material. In an example variation of any embodiment, the material comprises glass or plastic. In an example variation of any embodiment, the glass comprises a silane or organosilane coating. In an example variation of any embodiment, the first substrate comprises a different material from the material of the second substrate. In an example variation of any embodiment, the first substrate comprises glass and the second substrate comprises plastic. In an example variation of any embodiment, there is disclosed a receptacle that houses at least the first channel port, wherein the receptacle defines a basin. In an example variation of any embodiment, the receptacle is configured to mate with a pipette adapter wherein the pipette adapter is configured to facilitate introduction of a nucleic acid library starting materials into the flow cell. In an example variation of any embodiment, there is disclosed a pipette adapter wherein the pipette adapter mates with the basin of the receptacle. In an example variation of any embodiment, the pipette adapter includes a pipette fluid inlet that aligns with the first channel port, the pipette fluid inlet configured to receive a pipette. In an example variation of any embodiment, the pipette adapter includes an overmold that aligns with the with the first channel port when the pipette adapter mates with the receptacle. In an example variation of any embodiment, the receptacle is configured to mate with an adapter that connects the flow cell channels to a fluidic delivery apparatus. In an example variation of any embodiment, the fluidic delivery apparatus comprises at least one fluid line fluidly coupled to a fluidics system such that reagents and other fluids can be delivered to the channels of the flow cell. In an example variation of any embodiment, the adapter includes an overmold that mates with the at least one fluid line. In an example variation of any embodiment, the overmold enables high pressure fluid flow through the at least one fluid line and inhibits leaking of fluid from the at least one fluid line. In an example variation of any embodiment, the overmold enables high pressure fluid flow through the at least one fluid line and inhibits leaking of fluid from the at least one fluid line at an interface between the at least one fluid line and a flow cell.

In another example embodiment, there is disclosed an adapter device for facilitating ingress or egress of fluid relative to a flow cell, the adapter comprising: an outer housing configured to mate with the flow cell, the housing including a first port that aligns with an ingress or egress of the flow cell, the port configured to receive a tube that delivers or receives fluid relative to the flow cell; and a first overmold positioned inside the housing and aligned with the first port, the first overmold configured to secure the tube relative to the flow cell. In an example variation of any embodiment, the tube is a pipette. In an example variation of any embodiment, the tube is coupled to a fluidics system such that reagents and other fluids can be delivered to the channels of the flow cell. In an example variation of any embodiment, the first overmold is made of silicone. In an example variation of any embodiment, the first port aligns with an ingress of the flow cell. In an example variation of any embodiment, the housing further comprises a second port that aligns with an egress of the flow cell, and further comprising a second overmold positioned inside the housing and aligned with the second port. In an example variation of any embodiment, the overmold enables high pressure fluid flow through the tube and inhibits leaking of fluid from the tube.

Throughout this application various publications, patents and/or patent applications have been referenced. The disclosures of these documents in their entireties are hereby incorporated by reference in this application. A number of embodiments have been described. Nevertheless, it will be understood that various modifications may be made. Accordingly, other embodiments are within the scope of the following claims.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

What is claimed is:

1. A flow cell comprising:

(a) a gasket interposed between a first substrate and a second substrate, wherein the gasket comprises a pressure sensitive adhesive, the pressure sensitive adhesive being in contact with one or both of the first and second substrates, wherein the gasket, the first substrate and the second substrate are impermeable to aqueous liquid and liquid adhesive, wherein the gasket has a footprint on the first substrate that delineates a channel for containing the aqueous liquid;

(b) a via in the gasket, the via containing a solidified liquid adhesive that bonds the first substrate to the second substrate, wherein the solidified liquid adhesive in the via is separated from the channel by the gasket; and (c) a first channel port connecting the channel to an exterior of the flow cell, wherein the first channel port is permeable to the aqueous liquid.

2. The flow cell of claim 1, further comprising a via port connecting the via to the exterior of the flow cell.

3. The flow cell of claim 1, wherein the gasket comprises a plurality of vias, the plurality of vias each containing a solidified liquid adhesive that bonds the first substrate to the second substrate, wherein the solidified liquid adhesive in each of the plurality of vias is separated from the channel by the gasket.

4. The flow cell of claim 1, wherein the channel comprises an array of analytes attached to the first substrate in the channel.

5. The flow cell of claim 4, wherein a second array of analytes is attached to the second substrate in the channel.

6. The flow cell of claim 4, wherein the analytes comprise nucleic acids, different nucleic acids being attached to respective sites of the array.

7. The flow cell of claim 6, wherein the array comprises at least 100 of the sites per $mm^2$.

8. The flow cell of claim 1, wherein the gasket has a footprint on the second substrate that delineates the channel for containing the aqueous liquid, wherein the footprint on the first substrate is the same shape as the footprint on the second substrate, and wherein the first substrate comprises a planar surface that forms a first side of the channel and the second substrate comprises a planar surface that forms a second side of the channel.

9. The flow cell of claim 1, further comprising a second channel port connecting the channel to the exterior of the flow cell, wherein the second channel port is permeable to the aqueous liquid.

10. The flow cell of claim 1, wherein the aqueous liquid is present in the channel.

11. The flow cell of claim 10, wherein the aqueous liquid exerts a positive pressure of at least 10 PSI on the channel.

12. The flow cell of claim 1, wherein the gasket delineates a distance between the first and second substrate in the channel.

13. The flow cell of claim 12, wherein the distance is greater than 0.1 mm and less than 1 cm.

14. The flow cell of claim 1, wherein one or both of the first and second substrates is transparent to UV, VIS or IR radiation.

15. The flow cell of claim 1, wherein the channel comprises a turn of at least ninety degrees, wherein the turn has an inner wall and an outer wall, the inner wall having substantially the same length as the outer wall.

16. A nucleic acid sequencing system comprising:

(a) a flow cell of claim 1; and (b) an optical detection system configured to detect the inside of the flow cell.

17. A flow cell comprising:

(a) a gasket interposed between a first substrate and a second substrate, wherein the gasket, the first substrate and the second substrate are impermeable to aqueous liquid and liquid adhesive, wherein the gasket has a footprint on the first substrate that delineates a channel for containing the aqueous liquid;

(b) a via in the gasket that contiguously encircles the channel, the via containing a solidified liquid adhesive that bonds the first substrate to the second substrate, wherein the solidified liquid adhesive in the via is separated from the channel by the gasket; and (c) a first channel port connecting the channel to the exterior of the flow cell, wherein the first channel port is permeable to the aqueous liquid.

18. A flow cell comprising:

(a) a gasket interposed between a first substrate and a second substrate, wherein the gasket, the first substrate and the second substrate are impermeable to aqueous liquid and liquid adhesive, wherein the gasket has a footprint on the first substrate that delineates a plurality of channels for containing the aqueous liquid;

(b) a via in the gasket that contiguously encircles individual channels of the plurality of channels in the flow cell, the via containing a solidified liquid adhesive that bonds the first substrate to the second substrate, wherein the solidified liquid adhesive in the via is separated from the channel by the gasket; and (c) respective channel ports connecting each of the plurality of channels to the exterior of the flow cell, wherein each of the channel ports is permeable to the aqueous liquid.

* * * * *